US012739204B2

(12) United States Patent
Li et al.

(10) Patent No.: US 12,739,204 B2
(45) Date of Patent: Sep. 15, 2026

(54) PACKET PROCESSING METHOD AND RELATED APPARATUS WITH SLICE IDENTIFIERS AND SUB-IDENTIFIERS

(71) Applicant: HUAWEI TECHNOLOGIES CO., LTD., Shenzhen (CN)

(72) Inventors: Zhenbin Li, Beijing (CN); Jie Dong, Beijing (CN); Tao Han, Nanjing (CN); Ping'an Yang, Nanjing (CN); Zhibo Hu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 186 days.

(21) Appl. No.: 18/228,503

(22) Filed: Jul. 31, 2023

(65) Prior Publication Data

US 2023/0412508 A1 Dec. 21, 2023

Related U.S. Application Data

(63) Continuation of application No. PCT/CN2021/141540, filed on Dec. 27, 2021.

(30) Foreign Application Priority Data

Feb. 2, 2021 (CN) ......................... 202110143450.6
Apr. 27, 2021 (CN) ......................... 202110461985.8

(51) Int. Cl.
*H04L 45/76* (2022.01)
*H04L 41/40* (2022.01)
(Continued)

(52) U.S. Cl.
CPC .............. *H04L 45/76* (2022.05); *H04L 41/40* (2022.05); *H04L 45/036* (2022.05); *H04L 45/308* (2013.01)

(58) Field of Classification Search
CPC ......... H04L 45/76; H04L 45/14; H04L 45/02; H04L 41/40; H04L 41/082;
(Continued)

(56) References Cited

U.S. PATENT DOCUMENTS 10,601,724 B1 * 3/2020 Filsfils .................. H04L 45/302
11,310,733 B1 * 4/2022 Gupta .................. H04W 4/021
(Continued)

FOREIGN PATENT DOCUMENTS

CN 110620678 A * 12/2019 ......... H04L 12/4625
CN 110912795 A * 3/2020 ......... H04L 12/4633
(Continued)

OTHER PUBLICATIONS

U.S. Appl. No. 63/157,810—SRV6 Micro Segment Identifiers Invoking Network Behavior Including Realization of Network Slices, Specification, Mar. 7, 2021. (Year: 2021).*

*Primary Examiner* — Alina A Boutah
(74) *Attorney, Agent, or Firm* — WOMBLE BOND DICKINSON (US) LLP

(57) ABSTRACT

This application discloses a packet processing method and a related apparatus, applied to a network slice. The method includes: A first network device obtains a first packet, where the first packet includes a first slice identifier, the first slice identifier includes a plurality of consecutive sub-identifiers, the plurality of sub-identifiers indicate different attributes of a first network slice, and the first slice identifier identifies the first network slice to which the first packet belongs. The first network device forwards the first packet based on the first slice identifier. In this solution, a slice identifier including a plurality of sub-identifiers is carried in a packet. Different sub-identifiers indicate different attributes of a network slice.

20 Claims, 10 Drawing Sheets

(51) Int. Cl.

| | |
|---|---|
| ***H04L 45/00*** | (2022.01) |
| ***H04L 45/036*** | (2022.01) |
| ***H04L 45/302*** | (2022.01) |
| ***H04L 45/74*** | (2022.01) |
| ***H04L 47/70*** | (2022.01) |

(58) Field of Classification Search

CPC . H04L 41/0896; H04L 41/064; H04L 45/036; H04L 45/308; H04L 45/306; H04L 45/34; H04L 45/50; H04L 45/74; H04L 47/724; H04L 47/829; H04L 47/10; H04L 47/30; H04L 69/22; H04L 69/042; H04L 69/14

See application file for complete search history.

(56) References Cited

U.S. PATENT DOCUMENTS

| | | | | |
|---|---|---|---|---|
| 11,615,082 | B1 * | 3/2023 | Shrigondekar | G06F 16/245<br>707/769 |
| 2013/0132533 | A1 * | 5/2013 | Padmanabhan | G06F 9/45558<br>709/220 |
| 2018/0270743 | A1 * | 9/2018 | Callard | H04W 28/0268 |
| 2019/0357301 | A1 * | 11/2019 | Li | H04W 40/20 |
| 2020/0366607 | A1 | 11/2020 | Kommula et al. | |
| 2021/0112428 | A1 * | 4/2021 | Young | H04L 41/0895 |
| 2021/0321325 | A1 * | 10/2021 | Srivastava | H04L 67/1034 |
| 2022/0030117 | A1 * | 1/2022 | Young | H04L 43/065 |
| 2022/0053375 | A1 * | 2/2022 | Asawa | H04W 72/0453 |
| 2022/0086082 | A1 * | 3/2022 | Saad | H04L 45/50 |
| 2022/0286395 | A1 * | 9/2022 | Gandhi | H04L 45/20 |
| 2023/0140532 | A1 * | 5/2023 | Estevez | H04W 4/60<br>370/235 |

FOREIGN PATENT DOCUMENTS

| | | | | | |
|---|---|---|---|---|---|
| CN | 111107004 | A | * | 5/2020 | H04L 45/02 |
| CN | 111835637 | A | | 10/2020 | |
| CN | 112152899 | A | | 12/2020 | |
| CN | 112491713 | A | * | 3/2021 | H04L 41/0806 |
| CN | 113055202 | A | * | 6/2021 | H04L 41/00 |
| CN | 114157600 | A | * | 3/2022 | H04L 45/24 |
| CN | 114189905 | A | * | 3/2022 | H04L 12/4633 |
| CN | 114520782 | A | * | 5/2022 | |
| CN | 115484152 | A | * | 12/2022 | H04L 41/0889 |
| EP | 3531634 | A1 | * | 8/2019 | H04W 76/12 |
| EP | 3883286 | A1 | * | 9/2021 | H04L 41/40 |
| EP | 3917085 | A1 | * | 12/2021 | H04L 41/0806 |
| EP | 4084407 | A1 | * | 11/2022 | H04L 45/50 |
| WO | WO-2019056883 | A1 | * | 3/2019 | H04W 28/24 |
| WO | WO-2019235984 | A1 | * | 12/2019 | H04L 41/0213 |
| WO | WO-2020211609 | A1 | * | 10/2020 | H04L 45/02 |

* cited by examiner

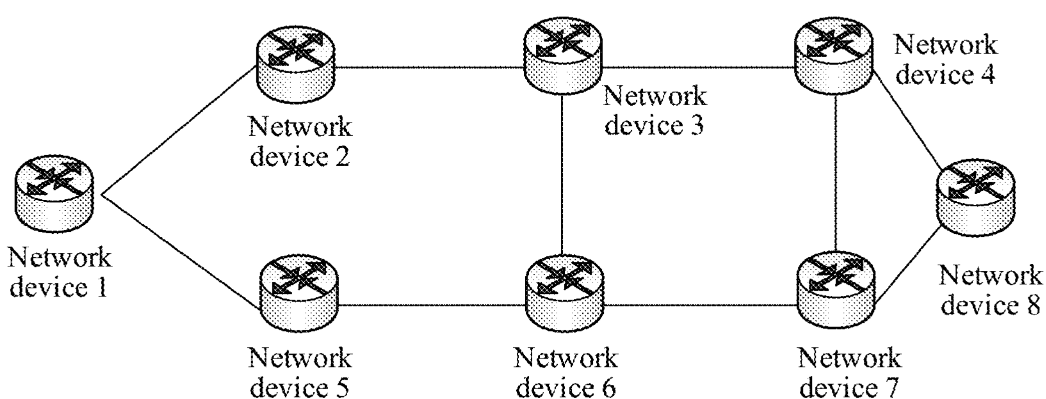
FIG. 1
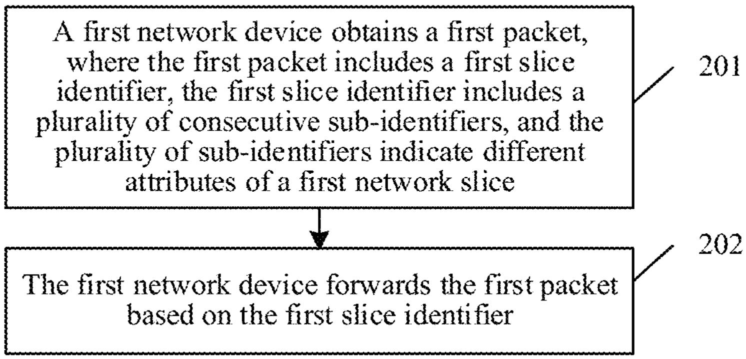
FIG. 2
First slice identifier
| Topology identifier | Resource identifier |
| --- | --- |
FIG. 3a
First slice identifier
| Topology identifier | Level-1 resource identifier | Level-2 resource identifier |
| --- | --- | --- |
FIG. 3b First slice identifier

| Algorithm identifier | Resource identifier |
|---|---|

First slice identifier

| Topology identifier | Algorithm identifier | Resource identifier |
|---|---|---|

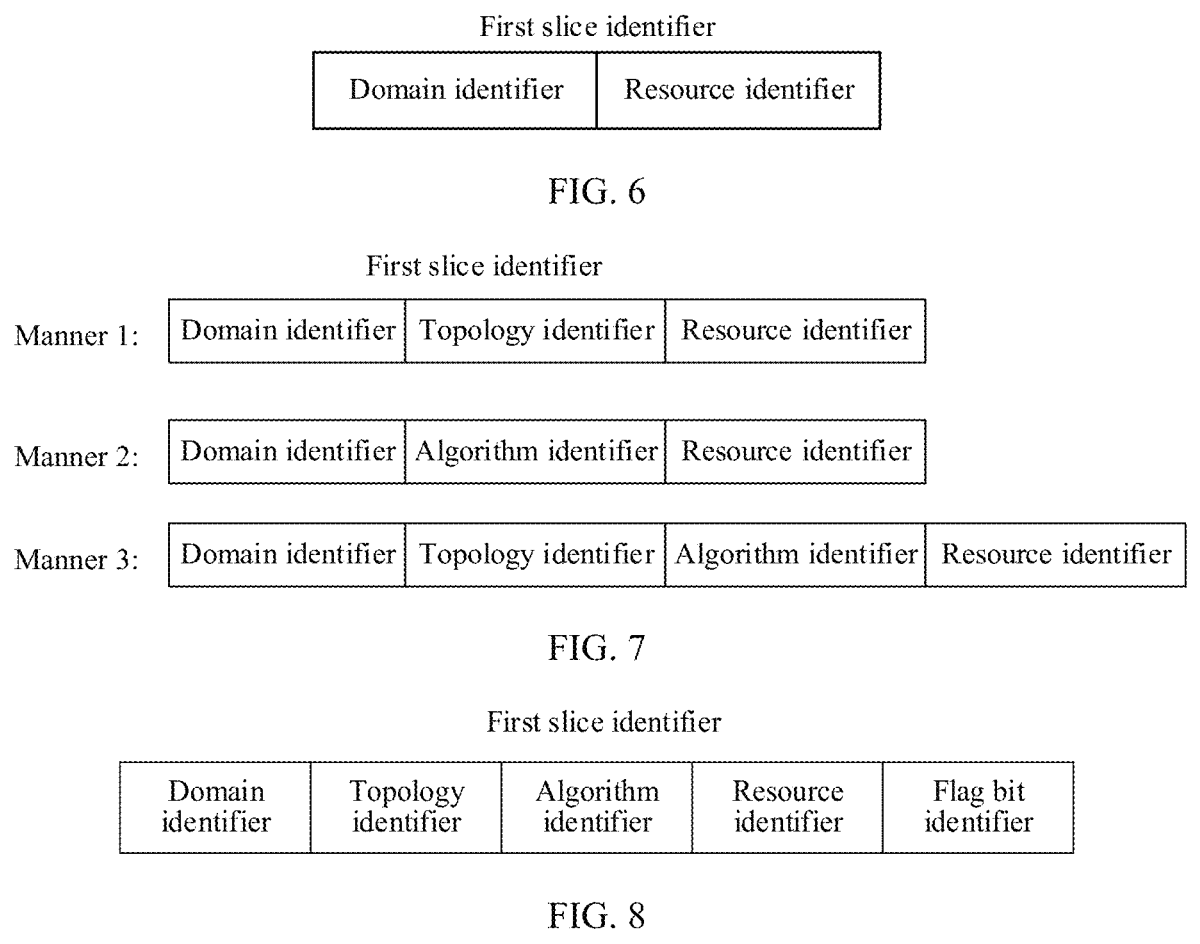

First slice identifier

| Domain identifier | Resource identifier |
|---|---|

FIG. 6

First slice identifier

| | | | | |
|---|---|---|---|---|
| Manner 1: | Domain identifier | Topology identifier | Resource identifier | |
| Manner 2: | Domain identifier | Algorithm identifier | Resource identifier | |
| Manner 3: | Domain identifier | Topology identifier | Algorithm identifier | Resource identifier |

FIG. 7

First slice identifier

| Domain identifier | Topology identifier | Algorithm identifier | Resource identifier | Flag bit identifier |
|---|---|---|---|---|

FIG. 8

PACKET PROCESSING METHOD AND RELATED APPARATUS WITH SLICE IDENTIFIERS AND SUB-IDENTIFIERS

CROSS-REFERENCE TO RELATED APPLICATIONS

This application is a continuation of International Application No. PCT/CN2021/141540, filed on Dec. 27, 2021, which claims priority to Chinese Patent Application No. 202110143450.6, filed on Feb. 2, 2021, and Chinese Patent Application No. 202110461985.8, filed on Apr. 27, 2021. All of the aforementioned patent applications are hereby incorporated by reference in their entireties.

TECHNICAL FIELD

This application relates to the field of communication technologies, and in particular, to a packet processing method and a related apparatus.

BACKGROUND

Network slicing is a virtualization form that allows a plurality of logical networks to run on a shared physical network infrastructure. In other words, based on a shared physical network, corresponding network slices (or virtual networks) are obtained through cutting by using a virtualization technology, to meet differentiated requirements of users. Virtual network slices are logically isolated in terms of resources, independent of each other, and do not affect each other.

Currently, a solution for implementing packet forwarding based on a network slice in a bearer network is as follows: A controller uniformly allocates a slice identifier to each network slice. A packet received by a network device carries the slice identifier. The network device determines the network slice based on the slice identifier, and forwards the packet through a resource corresponding to the determined network slice.

However, the current slice identifier is a global identifier. All devices in the network are required to consistently understand the meaning of the slice identifier and forward the packet through the resource indicated by the slice identifier. Different devices in the network may support different slicing capabilities, and different devices may also support different quantities of slices. Consequently, it is difficult to ensure that all the devices can use the same slice identifier to perform the corresponding packet forwarding behavior.

SUMMARY

This application provides a packet processing method. A slice identifier including a plurality of sub-identifiers is carried in a packet. Different sub-identifiers indicate different attributes of a network slice. This ensures that a device with a different slicing capability can also perform a corresponding packet forwarding behavior based on the attribute of the network slice that is indicated by the slice identifier.

A first aspect of this application provides a packet processing method, where the method includes: A first network device obtains a first packet, where the first packet includes a first slice identifier. The first slice identifier identifies the first network slice to which the first packet belongs. The first slice identifier includes a plurality of consecutive sub-identifiers, and each sub-identifier may be represented by one field. Therefore, the first slice identifier may be represented by a plurality of consecutive fields. The plurality of sub-identifiers in the first slice identifier indicate different attributes of the first network slice, for example, a topology, a path computation algorithm, or a forwarding resource of the first network slice. After obtaining the first packet, the first network device forwards the first packet based on the first slice identifier in the first packet. Specifically, the first network device can determine, based on the first slice identifier in the first packet, the first network slice to which the first packet belongs. Therefore, the first network device can forward the first packet based on a resource corresponding to the first network slice.

In this embodiment, a slice identifier including a plurality of sub-identifiers is carried in a packet. Different sub-identifiers indicate different attributes of a network slice. This ensures that a device with a different slicing capability can also perform a corresponding packet forwarding behavior based on the attribute of the network slice that is indicated by the slice identifier.

In an embodiment, the plurality of sub-identifiers include a topology identifier and a resource identifier. The topology identifier indicates a topology of the first network slice, that is, a topology to which the first network slice belongs in a network domain. The resource identifier indicates a forwarding resource of the first network slice. For example, the forwarding resource of the first network slice includes a physical interface, a logical sub-interface, and/or a packet queue.

In a scenario in which the network domain is divided into a plurality of topologies, the slice identifier in the packet forwarded in the network domain may include the topology identifier and the resource identifier. The network device determines the topology of the network slice through the topology identifier, and further determines, based on the resource identifier, the forwarding resource corresponding to the network slice.

In this embodiment, the topology identifier and the resource identifier are carried in the packet to indicate the network slice to which the packet belongs. Network slices having different topologies and different forwarding resources can use a same destination IP address, MPLS label, or SID to identify a same destination node, thereby avoiding planning more IP addresses, MPLS labels, or SIDs for the slices. In addition, the topology identifier and the resource identifier are separately carried. A plurality of slices having a same topology can be forwarded through forwarding entries of a same topology, thereby reducing the possibility of an increase in a quantity of the forwarding entries caused by slices.

In an embodiment, the plurality of sub-identifiers further include an algorithm identifier, and the algorithm identifier indicates a path computation algorithm of the first network slice. In other words, the first slice identifier includes the topology identifier, the algorithm identifier, and the resource identifier.

Specifically, in a process of forwarding the first packet, the first network device first determines, based on information indicating a forwarding path (for example, the destination address, the MPLS label, or the SID) in the first packet, a destination node of the first packet. Then, the first network device determines, based on the topology identifier in the first packet, a topology for reaching the destination node, and determines, based on the algorithm identifier in the first packet, a path computation algorithm for reaching the destination node, to obtain an interface for forwarding the packet. Finally, the first network device determines, based on the resource identifier in the first packet, the corresponding forwarding resource (for example, a logical sub-interface or a queue) on the interface to forward the first packet.

In this embodiment, the topology identifier, the algorithm identifier, and the resource identifier are carried in the packet. Network slices having different topologies, using different algorithms, and having different resources can use same information to identify the same destination node, thereby avoiding planning more destination node information for the slices. In addition, the topology identifier, the algorithm identifier, and the resource identifier are separately carried. A plurality of slices having a same topology or algorithm can be forwarded through forwarding entries of a same topology or algorithm, thereby reducing the possibility of an increase in a quantity of the forwarding entries caused by slices.

In an embodiment, the plurality of sub-identifiers include an algorithm identifier and a resource identifier, the algorithm identifier indicates a path computation algorithm of the first network slice, and the resource identifier indicates a forwarding resource of the first network slice.

When the first slice identifier includes the algorithm identifier and the resource identifier, the first network device first determines, based on information indicating a forwarding path (for example, the destination address, the MPLS label, or the SID) in the first packet, a destination node of the first packet. Then, the first network device determines, based on the algorithm identifier in the first packet, a path computation algorithm for reaching the destination nod, to obtain an interface corresponding to the forwarding path obtained when the path computation algorithm is used. Finally, the first network device determines, based on the resource identifier in the first packet, the corresponding forwarding resource (for example, a logical sub-interface or a queue) on the interface to forward the first packet.

In this embodiment, the algorithm identifier and the resource identifier are carried in the packet to indicate the network slice to which the packet belongs. Network slices having different topologies and different forwarding resources can use same information to identify the same destination node, thereby avoiding planning more destination node information for the slices. In addition, the algorithm identifier and the resource identifier are separately carried. A plurality of slices having a same path computation algorithm can be forwarded through forwarding entries of a same algorithm, thereby reducing the possibility of an increase in a quantity of the forwarding entries caused by slices.

In an embodiment, the plurality of sub-identifiers further include a domain identifier, and the domain identifier indicates a network domain in which the first slice identifier is effective. For example, the plurality of sub-identifiers include a domain identifier, a topology identifier, and a resource identifier; or the plurality of sub-identifiers include a domain identifier, an algorithm identifier, and a resource identifier; or the plurality of sub-identifiers include a domain identifier, a topology identifier, an algorithm identifier, and a resource identifier.

In this embodiment, the domain identifier is carried in the slice identifier. The network domain in which the slice identifier is effective can be indicated, ensuring that the packet can be smoothly forwarded in different network domains.

In an embodiment, the plurality of sub-identifiers include a domain identifier and a resource identifier, the domain identifier indicates a network domain in which the first slice identifier is effective, and the resource identifier indicates a forwarding resource of the first network slice. The domain identifier indicates the network domain in which the first slice identifier is effective. The resource identifier indicates the forwarding resource of the first network slice.

A manner of combining sub-identifiers including the domain identifier and the resource identifier in the slice identifier is applicable to a network slicing scenario that crosses a plurality of network domains. In this scenario, network slices in each network domain may use different domain identifiers and resource identifiers. Network slices in the plurality of network domains are combined to form a cross-domain network slice.

In an embodiment, the forwarding resource includes a physical interface, a logical sub-interface, and/or a packet queue.

In an embodiment, that the first network device forwards the first packet based on the first slice identifier includes: The first network device determines, based on the sub-identifiers in the first slice identifier and a mapping table, an interface for forwarding the first packet and a forwarding resource of the interface. The first network device forwards the first packet to a second network device based on the forwarding resource of the interface. The mapping table includes a mapping relationship between the interface and the plurality of sub-identifiers. The mapping table may include a mapping relationship between a pair of the interface and the forwarding resource of the interface and the plurality of sub-identifiers. Alternatively, the mapping table may include a plurality of mapping sub-tables, and the plurality of mapping sub-tables each include a mapping relationship between each sub-identifier and the interface.

In an embodiment, the plurality of sub-identifiers further include a flag bit identifier. For example, in addition to the topology identifier and the resource identifier, the first slice identifier further includes the flag bit identifier. For another example, in addition to the domain identifier, the topology identifier, the algorithm identifier, and the resource identifier, the first slice identifier further includes the flag bit identifier. The flag bit identifier indicates a sub-identifier that guides forwarding in the first slice identifier and a forwarding policy corresponding to the first slice identifier.

The sub-identifier that guides forwarding is a sub-identifier that is selected by the network device to guide packet forwarding in the first slice identifier. The sub-identifier that guides forwarding may be one or more sub-identifiers other than the flag bit identifier in the first slice identifier. For example, when the first slice identifier includes the domain identifier, the topology identifier, the algorithm identifier, the resource identifier, and the flag bit identifier, the sub-identifier that guides forwarding may be the topology identifier and the algorithm identifier; or the sub-identifier that guides forwarding may be the topology identifier, the algorithm identifier, and the resource identifier. In brief, the flag bit identifier indicates which sub-identifiers in the slice identifier need to be used by the network device for packet forwarding.

The forwarding policy indicated by the flag bit identifier indicates a forwarding behavior after an interface is determined based on the sub-identifier that guides forwarding.

In an embodiment, the forwarding behavior may be: If the first network device cannot find, based on the first slice identifier, the interface for forwarding, the first network device may skip determining, based on the first slice identifier, the interface for forwarding, and the first network device may forward the packet based on a default slice; or if the first network device cannot find, based on the first slice identifier, the interface for forwarding, the first network device discards the first packet.

In this embodiment, the flag bit identifier is carried in the slice identifier to indicate the sub-identifier that guides forwarding and the forwarding policy. The network device can forward the packet based on different policies, thereby meeting diversified service requirements in a packet forwarding process.

In an embodiment, in a cross-domain scenario, the method further includes: The first network device receives a second packet, where the second packet includes a second slice identifier. The first network device updates the second slice identifier to the first slice identifier, to obtain the first packet. The second slice identifier is effective in a second network domain. The first slice identifier is effective in a first network domain where the first network device is located.

In an embodiment, the first slice identifier indicates the first network slice in the first network domain, the second slice identifier indicates a second network slice in the second network domain, and a service-level agreement (SLA) of the first network slice is the same as an SLA of the second network slice. In other words, network quality of the first network slice is the same as network quality of the second network slice.

In an embodiment, the first network device is a boundary node in a bearer network. The first network device receives a packet sent by a network device in a network outside the bearer network, where the packet carries a slice identifier of an entire network. The first network device may receive a second packet sent by a network device in an access network or a core network, where the packet carries a second slice identifier, and the second slice identifier is effective in the entire network. In other words, the second slice identifier is effective in the access network, the bearer network, and the core network. For example, the second slice identifier is single network slice selection assistance information (S-NSSAI) or an application-aware networking (APN) identifier.

In an embodiment, the first network device is the boundary node in the bearer network. The second packet obtained by the first network device carries the second slice identifier that is effective in the bearer network including a plurality of network domains. The second slice identifier can indicate a network slice to which the second packet belongs in the plurality of network domains of the entire bearer network. A format of the second slice identifier may be the same as a format of the first slice identifier. The format of the second slice identifier may also be different from the format of the first slice identifier. In this way, the first network device can convert the second slice identifier that is effective in the plurality of network domains into the first slice identifier that is effective in the network domain where the first network device is located.

In an embodiment, the first network device may be located in a network domain in the bearer network. The first network device receives a packet sent by a network device outside the network domain. Specifically, the first network device receives a third packet, and determines the network slice to which the third packet belongs. The third packet is from a network device outside the network domain to which the first network device belongs. Then, the first network device adds, based on the network slice to which the third packet belongs, the first slice identifier to the third packet, to obtain the first packet.

In an embodiment, that the first network device determines the network slice to which the third packet belongs includes: The first network device determines, based on information in the third packet, the network slice to which the third packet belongs. The information in the third packet includes one or more of the following information: a source address, a destination address, a protocol number, a differentiated services code point (DSCP) field, a traffic class field, a virtual local area network identifier (VLAN ID), and a port number.

In an embodiment, that the first network device adds, based on the network slice to which the third packet belongs, the first slice identifier to the third packet includes: The first network device adds, based on the network slice to which the third packet belongs, the first slice identifier and a fourth slice identifier to the third packet, to obtain the first packet. The fourth slice identifier identifies, in a bearer network including a plurality of network domains, the network slice to which the third packet belongs.

In an embodiment, that the first network device determines the network slice to which the third packet belongs includes: The first network device determines, based on a third slice identifier in the third packet, the network slice to which the third packet belongs. The third slice identifier identifies, in a bearer network including a plurality of network domains, the network slice to which the third packet belongs.

In brief, the third slice identifier in the third packet is a global identifier in the bearer network, and is effective in the plurality of network domains of the entire bearer network. In other words, the third slice identifier can identify, in the plurality of network domains of the bearer network, the network slice to which the third packet belongs.

Therefore, the first network device may determine, based on the third slice identifier, the network slice to which the third packet belongs, to obtain the first slice identifier that is effective in the network domain where the first network device is located. Then, the first network device adds the first slice identifier to the third packet to obtain the first packet. The first packet includes both the third slice identifier and the first slice identifier.

When the third packet received by the first network device includes only the third slice identifier, the first network device adds the first slice identifier based on the third slice identifier. Therefore, the obtained first packet includes two slice identifiers: the third slice identifier and the first slice identifier.

When the third packet received by the first network device includes the third slice identifier and another slice identifier, that is, the first network device receives the third packet from a network device in a previous network domain, the first network device determines the first slice identifier based on the third slice identifier, and replaces the another slice identifier in the third packet with the first slice identifier. Therefore, the obtained first packet includes two slice identifiers: the third slice identifier and the first slice identifier.

A second aspect of this application provides a network device, including a transceiver unit and a processing unit. The transceiver unit is configured to obtain a first packet, where the first packet includes a first slice identifier, the first slice identifier includes a plurality of consecutive sub-identifiers, the plurality of sub-identifiers indicate different attributes of a first network slice, and the first slice identifier identifies the first network slice to which the first packet belongs. The transceiver unit is further configured to forward the first packet based on the first slice identifier.

In an embodiment, the plurality of sub-identifiers include a topology identifier and a resource identifier, the topology identifier indicates a topology of the first network slice, and the resource identifier indicates a forwarding resource of the first network slice.

In an embodiment, the plurality of sub-identifiers further include an algorithm identifier, and the algorithm identifier indicates a path computation algorithm of the first network slice.

In an embodiment, the plurality of sub-identifiers include an algorithm identifier and a resource identifier, the algorithm identifier indicates a path computation algorithm of the first network slice, and the resource identifier indicates a forwarding resource of the first network slice.

In an embodiment, the plurality of sub-identifiers further include a domain identifier, and the domain identifier indicates a network domain in which the first slice identifier is effective.

In an embodiment, the plurality of sub-identifiers include a domain identifier and a resource identifier, the domain identifier indicates a network domain in which the first slice identifier is effective, and the resource identifier indicates a forwarding resource of the first network slice.

In an embodiment, the forwarding resource includes a physical interface, a logical sub-interface, and/or a packet queue.

In an embodiment, the processing unit is configured to determine, based on the sub-identifiers in the first slice identifier and a mapping table, an interface for forwarding the first packet and a forwarding resource of the interface. The forwarding unit is further configured to forward the first packet to a second network device based on the forwarding resource of the interface. The mapping table includes a mapping relationship between the interface and the plurality of sub-identifiers.

In an embodiment, the plurality of sub-identifiers further include a flag bit identifier, the flag bit identifier indicates a forwarding policy corresponding to the first slice identifier, and the forwarding policy indicates a forwarding behavior performed after an interface is determined based on a sub-identifier for guiding forwarding.

In an embodiment, the forwarding behavior includes: if the interface for forwarding cannot be found based on the first slice identifier, skipping determining, based on the first slice identifier, the interface for forwarding; or discarding the first packet if the interface for forwarding cannot be found based on the first slice identifier.

In an embodiment, the transceiver unit is further configured to receive a second packet, where the second packet includes a second slice identifier. The processing unit is further configured to update the second slice identifier to the first slice identifier, to obtain the first packet.

In an embodiment, the first slice identifier indicates the first network slice in the first network domain, the second slice identifier indicates a second network slice in the second network domain, and a service-level agreement SLA of the first network slice is the same as an SLA of the second network slice.

In an embodiment, the first network device is a boundary node of a bearer network, and the second slice identifier is single network slice selection assistance information S-NSSAI or an application-aware networking APN identifier.

In an embodiment, the transceiver unit is further configured to receive a third packet. The processing unit is further configured to determine the network slice to which the third packet belongs. The processing unit is further configured to add, based on the network slice to which the third packet belongs, the first slice identifier to the third packet, to obtain the first packet.

In an embodiment, the processing unit is further configured to determine, based on information in the third packet, the network slice to which the third packet belongs. The information in the third packet includes one or more of the following information: a source address, a destination address, a protocol number, a differentiated services code point DSCP field, a traffic class TC field, a virtual local area network identifier, and a port number.

In an embodiment, the processing unit is further configured to add, based on the network slice to which the third packet belongs, the first slice identifier and a fourth slice identifier to the third packet, to obtain the first packet. The fourth slice identifier identifies, in a bearer network including a plurality of network domains, the network slice to which the third packet belongs.

In an embodiment, the processing unit is further configured to determine, based on a third slice identifier in the third packet, the network slice to which the third packet belongs. The third slice identifier identifies, in a bearer network including a plurality of network domains, the network slice to which the third packet belongs.

A third aspect of this application provides a network device. The network device includes a processor, configured to enable the network device to implement the method according to any embodiments of the first aspect. The device may further include a memory. The memory is coupled to the processor. When the processor executes instructions stored in the memory, the network device may be enabled to implement the method according to any embodiment of the first aspect. The device may further include a communication interface. The communication interface is used by the apparatus to communicate with another device. For example, the communication interface may be a transceiver, a circuit, a bus, a module, or another type of communication interface.

In this application, the instructions in the memory may be stored in advance, or may be stored after being downloaded from the Internet when the network device is used. A source of the instructions in the memory is not specifically limited in this application. The coupling in this application is an indirect coupling or a connection between apparatuses, units, or modules, may be in an electrical form, a mechanical form, or another form, and is used for information exchange between the apparatuses, the units, or the modules.

A fourth aspect of this application provides a network system. The network system includes a plurality of network devices, and the plurality of network devices include the network device according to the third aspect. When the network device obtains the packet, the network device can implement the method according to any embodiments of the first aspect.

A fifth aspect of this application provides a computer storage medium. The computer storage medium may be non-volatile. The computer storage medium stores computer-readable instructions, and when the computer-readable instructions are executed by a processor, the method according to any embodiments of the first aspect is implemented.

A sixth aspect of this application provides a computer program product, including instructions. The computer program product, when run on a computer, enables the computer to implement the method according to any embodiments of the first aspect.

The solutions provided in the second aspect to the sixth aspect are used to implement or cooperate to implement the method provided in the first aspect, and therefore, can achieve beneficial effects the same as or corresponding to those in the first aspect. Details are not described herein again.

BRIEF DESCRIPTION OF DRAWINGS

FIG. 1 is a schematic structural diagram of a network according to an embodiment of this application;

FIG. 2 is a schematic flowchart of a packet processing method 200 according to an embodiment of this application;

FIG. 3*a* is a schematic structural diagram of a slice identifier according to an embodiment of this application;

FIG. 3*b* is a schematic structural diagram of another slice identifier according to an embodiment of this application;

FIG. 6 is a schematic structural diagram of another slice identifier according to an embodiment of this application;

FIG. 7 is another schematic structural diagram of a first slice identifier according to an embodiment of this application;

FIG. 8 is a schematic structural diagram of a first slice identifier according to an embodiment of this application;

DESCRIPTION OF EMBODIMENT

Figures 3C, 4A:
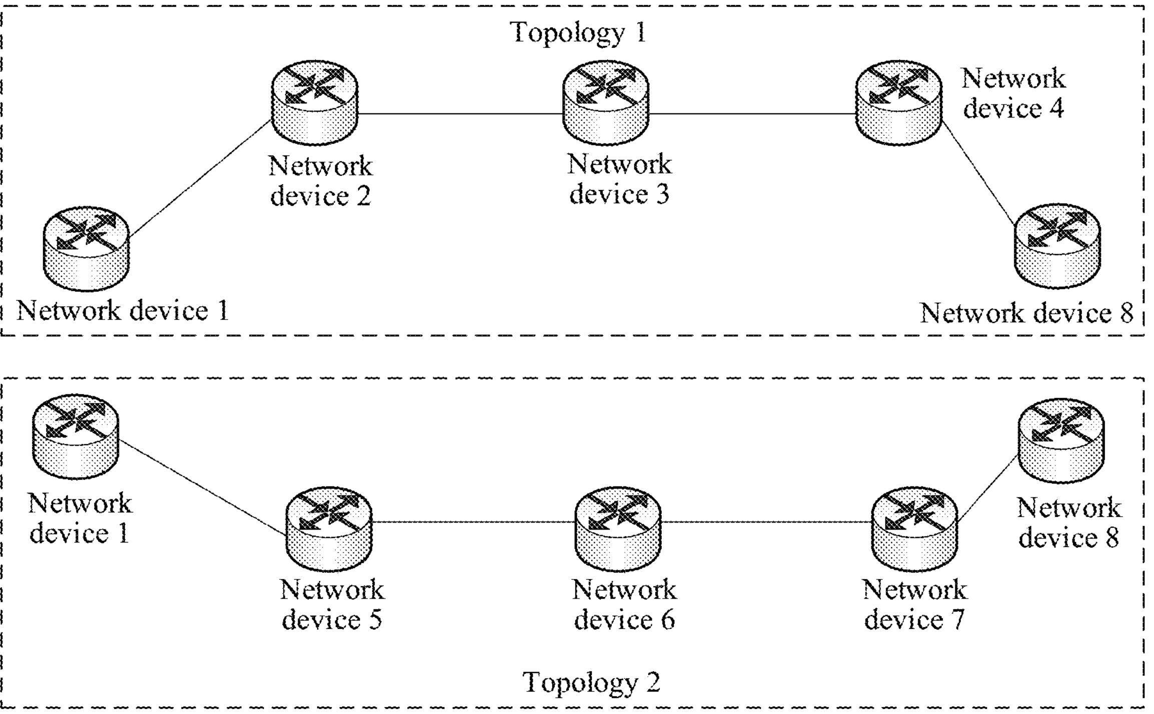
FIG. 3*c* is a schematic diagram of packet forwarding according to an embodiment of this application.
FIG. 4*a* is a schematic structural diagram of a slice identifier according to an embodiment of this application.

To make objectives, technical solutions, and advantages of this application clearer, the following describes embodiments of this application with reference to the accompanying drawings. It is clear that the described embodiments are merely some but not all of embodiments of this application. A person of ordinary skill in the art may learn that, as a new application scenario emerges, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that embodiments of the present application described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Unit division in this application is logical division and may be other division during actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in this application. In addition, units or subunits described as separate parts may or may not be physically separate, may or may not be physical units, or may be distributed into a plurality of circuit units. Some or all of the units may be selected according to actual requirements to achieve the objectives of the solutions of this application.

In a 5G network, diversified service requirements have different demands on the network in terms of speed, performance, security, reliability, and latency. For example, an enhanced mobile broadband (eMBB) scenario (for example, a virtual reality scenario or an augmented reality scenario) has a relatively high requirement for bandwidth, and requires xGbps-level bandwidth. For another example, in a massive machine type communication (mMTC) scenario (for example, a wearable scenario or a smart grid scenario), access of a large quantity of devices needs to be supported, for example, access of hundreds of millions or billions of devices needs to be supported. For another example, an ultra-reliable and low latency communication (uRLLC) scenario (for example, a self-driving scenario, a remote surgery scenario, or an industrial control scenario) needs to support ultra-low latency of 1 ms. A network slice emerges to meet different scenarios, different requirements, and a superior experience requirement by flexibly constructing a network with different features based on different scenarios and requirements.

The network slice is a logical network customized according to different service requirements on a physical or virtual network infrastructure. The network slice may be a complete end-to-end network including an access network, a bearer network, a core network, and an application server. The network slice can provide a complete communication service and has a specific network capability. Alternatively, the network slice may be any combination of an access network, a bearer network, a core network, and an application server.

One network slice may be usually considered as an instantiated 5G network. In such a network structure, an operator can provide a network for a user as a service, and can freely combine physical networks based on indicators such as a rate, a capacity, coverage, latency, reliability, security, and availability, to meet requirements of different users.

Currently, a solution for implementing packet forwarding based on a network slice in a bearer network is as follows: A controller uniformly allocates a slice identifier to each network slice. A packet received by a network device carries the slice identifier. The slice identifier and another field that indicates a destination address or a path in the packet jointly determine a forwarding behavior of the packet. When forwarding the packet, the network device determines an interface of the packet based on information such as a destination address field, a multi-protocol label switching (MPLS) label stack, or a segment routing header (SRH) in the packet. Then, the network device determines, based on the slice identifier in the packet, a network slice to which the packet belongs, and forwards the packet through a resource that is on the interface and that is corresponding to the network slice.

However, the current slice identifier is a global identifier. All devices in the network are required to consistently understand the meaning of the slice identifier and forward the packet through the resource indicated by the slice identifier. Different devices in the network may support different slicing capabilities, and different devices may also support different quantities of slices. Consequently, it is difficult to ensure that all the devices can use the same slice identifier to perform the corresponding packet forwarding behavior.

In addition, when a plurality of different network slices have a same attribute, for example, a topology or algorithm attribute, a same forwarding action may be performed on a group of network slices. That is, a packet is forwarded based on a same interface. However, because slice identifiers corresponding to network slices have different values independent of each other, the network device cannot obtain a common feature among slices based on the slice identifiers. In this case, the network device further needs to guide slice forwarding with reference to other identifiers in the packet, for example, a destination IP address field, an MPLS label, or a segment identifier (SID) shared by a same group of slices. This requires that the IP address, the MPLS label, or the SID be planned and allocated based on some attributes of the slices. For example, different IP addresses, MPLS labels, or SIDs are allocated to identify different topologies or algorithms, thereby increasing planning difficulties and quantities of IP addresses or labels.

In view of this, this embodiment of this application provides a packet processing method. A slice identifier including a plurality of sub-identifiers is carried in a packet. Different sub-identifiers indicate different attributes of a network slice. This ensures that a device with a different slicing capability can also perform a corresponding packet forwarding behavior based on the attribute of the network slice that is indicated by the slice identifier.

FIG. 1 is a schematic structural diagram of a network according to an embodiment of this application. The network shown in FIG. 1 includes a network device 1 to a network device 8. The network device 1 is a head node in the network, the network device 2 to the network device 7 are intermediate nodes in the network, and the network device 8 is a tail node in the network. The network device 1 encapsulates, into a packet, slice identifiers including a plurality of consecutive sub-identifiers, and sends the packet to an intermediate node in a network domain. The intermediate node in the network domain forwards the packet based on the slice identifier in the packet, to forward the packet to the network device 8 used as the tail node. The network device 8 forwards the packet to another network domain based on the slice identifier in the packet.

FIG. 2 is a schematic flowchart of a packet processing method 200 according to an embodiment of this application. The packet processing method 200 may be applied in the network structure shown in FIG. 1. As shown in FIG. 2, the packet processing method 200 includes at least the following steps.

Step 201: A first network device obtains a first packet, where the first packet includes a first slice identifier, the first slice identifier includes a plurality of consecutive sub-identifiers, the plurality of sub-identifiers indicate different attributes of a first network slice, and the first slice identifier identifies the first network slice to which the first packet belongs.

In this embodiment, the first Network device is a network in a bearer network. For example, the first network device may be a network device in an MPLS network, an Internet protocol version 4 (IPv4) network, or an Internet protocol version 6 (IPv6) network. For example, the first network device may be a physical device such as a router, a switch, or a gateway, or may be a virtual device that supports packet forwarding. A specific type of the first network device is not limited in this embodiment.

A manner in which the first network device obtains the first packet may be receiving a first packet sent by another network device, for example, receiving a data packet sent by a network device outside an MPLS network, or generating the first packet by the first network device, or receiving the first packet from a network device on an access network side.

The first packet includes a first slice identifier identifying the first network slice to which the first packet belongs. The first slice identifier includes a plurality of consecutive sub-identifiers, and each sub-identifier may be represented by one field. Therefore, the first slice identifier may be represented by a plurality of consecutive fields. The plurality of sub-identifiers in the first slice identifier indicate different attributes of the first network slice, for example, a topology, a path computation algorithm, or a forwarding resource of the first network slice.

The first slice identifier may be carried in different locations in data packets of different types. A manner of carrying the first slice identifier is not specifically limited in this embodiment.

In some embodiments, the first packet may be an IPv6 data packet. The first slice identifier may be carried in some fields of a fixed packet header of the IPv6 data packet, for example, a flow label field, a source address field, or a destination address field of the fixed packet header. The first slice identifier may be further carried in an extension packet header of the IPv6 data packet. The extension packet header of the IPv6 data packet may be, for example, a hop by hop (HBH) header, a routing extension header, or a destination extension header.

In some other embodiments, the first packet may be an MPLS data packet. The first slice identifier may be carried in an MPLS label stack of an MPLS packet header of the MPLS data packet. Alternatively, the first slice identifier may be carried in a control field or an extension header that is located after the MPLS packet header. The extension header in the MPLS data packet is located between an MPLS label and a payload.

Step 202: The first network device forwards the first packet based on the first slice identifier.

In this embodiment, the first network device can determine, based on the first slice identifier in the first packet, the first network slice to which the first packet belongs. Therefore, the first network device can forward the first packet based on a resource corresponding to the first network slice.

In this embodiment, a slice identifier including a plurality of sub-identifiers is carried in a packet. Different sub-identifiers indicate different attributes of a network slice. This ensures that a device with a different slicing capability can also perform a corresponding packet forwarding behavior based on the attribute of the network slice that is indicated by the slice identifier.

For ease of understanding, the following describes in detail the plurality of sub-identifiers included in the first slice identifier in different scenarios.

Scenario 1: The plurality of sub-identifiers in the first slice identifier include a topology identifier and a resource identifier.

FIG. 3*a* is a schematic structural diagram of a slice identifier according to an embodiment of this application. As shown in FIG. 3*a*, the first slice identifier includes the topology identifier and the resource identifier. The topology identifier indicates a topology of the first network slice, that is, a topology to which the first network slice belongs in a network domain. The resource identifier indicates a forwarding resource of the first network slice. For example, the forwarding resource of the first network slice includes a physical interface, a logical sub-interface, and/or a packet queue.

In an embodiment, in the first slice identifier, the resource identifier may include a plurality of levels of sub-identifiers, and different levels of sub-identifiers indicate different forwarding resources. A forwarding resource with a finer granularity can be indicated based on the plurality of levels of sub-identifiers in the resource identifier. FIG. 3*b* is a schematic structural diagram of another slice identifier according to an embodiment of this application. As shown in FIG. 3*b*, the resource identifier in the first slice identifier may include a level-1 resource identifier and a level-2 resource identifier, and the level-1 resource identifier and the level-2 resource identifier indicate different forwarding resources. For example, a resource indicated by the level-1 resource identifier is a logical sub-interface corresponding to an interface, and a resource indicated by the level-2 resource identifier is a queue resource corresponding to the logical sub-interface. In this way, the first network device can determine, based on the level-1 resource identifier and the level-2 resource identifier, the specific forwarding resource that is on the interface and that is used to forward a first packet.

In Scenario 1, the network domain where the first network device is located may divide topologies of the network slices in the network domain via a multi-topology technology. Different network slices in the network domain may correspond to different topologies. Different network slices in the network domain may also correspond to a same topology. However, forwarding resources allocated to different network slices by the network device are different, and the network device may distinguish the forwarding resources allocated to the different network slices based on the resource identifiers.

In other words, in a scenario in which the network domain is divided into a plurality of topologies, the slice identifier in the packet forwarded in the network domain may include the topology identifier and the resource identifier. The network device determines the topology of the network slice through the topology identifier, and further determines, based on the resource identifier, the forwarding resource corresponding to the network slice.

In a possible implementation, in a case where the first slice identifier includes the topology identifier and the resource identifier, a process in which the first network device forwards the first packet based on the first slice identifier is as follows: The first network device first determines, based on information indicating a forwarding path, such as a destination address, an MPLS label, or a segment identifier (SID) in the first packet, a destination node of the first packet. Then, the first network device determines, based on the topology identifier in the first packet, a topology for reaching the destination node, thereby obtaining an interface for reaching the destination node under this topology. Finally, the first network device determines, based on the resource identifier in the first packet, to use the corresponding forwarding resource (for example, a logical sub-interface or a queue) on the interface to forward the first packet.

In a specific implementation, a mapping table that guides packet forwarding may be preset in the first network device. For example, the mapping table may be delivered by a controller or manually configured. The mapping table of the first network device includes a mapping relationship between the interface and the plurality of sub-identifiers in the first slice identifier. The first network device first determines, based on information such as a destination address, an MPLS label, or a SID in the first packet, one or more interfaces for reaching the destination node of the first packet. Then, the first network device determines, based on the topology identifier, the resource identifier, and the mapping table, an interface for forwarding the first packet and a forwarding resource corresponding to the interface from one or more interfaces for reaching the destination node of the first packet. Finally, the first network device forwards the first packet to a second network device based on the determined interface and the forwarding resource corresponding to the interface.

In an embodiment, the mapping table in the first network device may include a mapping relationship between a pair of the interface and the forwarding resource of the interface and the plurality of sub-identifiers. In other words, the mapping table includes different sub-identifier combinations, and each sub-identifier combination has the corresponding interface and the forwarding resource of the interface. Moreover, different sub-identifier combinations correspond to different interfaces or different forwarding resources. For example, a topology identifier 1 and a resource identifier 1 correspond to an interface 1 and a queue 1 on the interface 1. A topology identifier 1 and a resource identifier 2 correspond to an interface 1 and a queue 2 on the interface 1. A topology identifier 2 and a resource identifier 3 correspond to an interface 2 and a queue 3 on the interface 2. In this way, the first network device may determine, based on the plurality of sub-identifiers in the first slice identifier and the mapping table, an interface that is in the mapping table and that is uniquely corresponding to the plurality of sub-identifiers and a forwarding resource of the interface.

In an embodiment, the mapping table in the first network device may alternatively include a plurality of different mapping sub-tables, and the different mapping sub-tables include mapping relationships between different sub-identifiers and interfaces or forwarding resources. For example, the mapping table in the first network device includes a mapping sub-table 1 and a mapping sub-table 2. The mapping sub-table 1 includes a mapping relationship between the topology identifier and the interface. The mapping sub-table 2 includes a mapping relationship between the resource identifier and the forwarding resource. The first network device may determine the interface based on the topology identifier and the mapping sub-table 1. Then, the first network device may determine the forwarding resource corresponding to the interface based on the resource identifier and the mapping sub-table 2.

For example, FIG. 3*c* is a schematic diagram of packet forwarding according to an embodiment of this application. In FIG. 3*c*, topology division is performed on the network structure shown in FIG. 1 via a multi-topology technology, to obtain a topology 1 and a topology 2. The topology 1 includes a network device 1, a network device 2, a network device 3, a network device 4, and a network device 8. The topology 2 includes a network device 1, a network device 5, a network device 6, a network device 7, and a network device 8.

It is assumed that the network device 1 obtains a packet, and a destination node of the packet is the network device 8. In addition, a topology identifier in the packet indicates the topology 1, and a resource identifier in the packet indicates the queue 1. In this case, the network device 1 may determine, based on the destination node of the packet, that an interface for forwarding the packet includes an interface between the network device 1 and the network device 2 and an interface between the network device 1 and the network device 5. Based on this, the network device 1 determines, based on the topology identifier in the packet, to use the topology 1 to forward the packet, to determine that the interface for forwarding the packet is the interface between the network device 1 and the network device 2. Further, the network device 1 determines, based on the resource identifier in the packet, to finally use the queue 1 corresponding to the interface between the network device 1 and the network device 2 to forward the packet.

In Scenario 1, the topology identifier and the resource identifier are carried in the packet to indicate the network slice to which the packet belongs. Network slices having different topologies and different forwarding resources can use a same destination IP address, MPLS label, or SID to identify the same destination node, thereby avoiding planning more IP addresses, MPLS labels, or SIDs for the slices. In addition, the topology identifier and the resource identifier are separately carried. A plurality of slices having a same topology can be forwarded through forwarding entries of a same topology, thereby reducing the possibility of an increase in a quantity of the forwarding entries caused by slices.

Scenario 2: The plurality of sub-identifiers in the first slice identifier include an algorithm identifier and a resource identifier.

FIG. 4*a* is a schematic structural diagram of a slice identifier according to an embodiment of this application. As shown in FIG. 4*a*, the first slice identifier includes the algorithm identifier and the resource identifier. The algorithm identifier indicates a path computation algorithm of the first network slice, that is, an algorithm used by the first network slice to perform path computation in the network domain. The resource identifier indicates a forwarding resource of the first network slice. For example, the forwarding resource of the first network slice includes a physical interface, a logical sub-interface, and/or a packet queue. The resource identifier in the first slice identifier may alternatively include a plurality of levels of sub-identifiers, and different levels of sub-identifiers indicate different forwarding resources. For a manner in which the resource identifier includes a plurality of levels of sub-identifiers, refer to the foregoing embodiments. Details are not described herein again.

In Scenario 2, the network domain where the first network device is located may define a path computation constraint of the network slice in the network domain through the path computation algorithm such as a flexible algorithm (Flex-Algo) or another specific algorithm. Different network slices in the network domain may respectively perform path computation through different path computation algorithms. Different network slices in the network domain may alternatively perform path computation through a same path computation algorithm. However, forwarding resources allocated to different network slices by the network device are different, and the network device may distinguish the forwarding resources allocated to the different network slices based on the resource identifiers.

In a possible implementation, when the first slice identifier includes the algorithm identifier and the resource identifier, a process in which the first network device forwards the first packet based on the first slice identifier is specifically as follows: The first network device first determines, based on information indicating a forwarding path (for example, the destination address, the MPLS label, or the SID) in the first packet, a destination node of the first packet. Then, the first network device determines, based on the algorithm identifier in the first packet, a path computation algorithm for reaching the destination nod, to obtain an interface corresponding to the forwarding path obtained when the path computation algorithm is used. Finally, the first network device determines, based on the resource identifier in the first packet, the corresponding forwarding resource (for example, a logical sub-interface or a queue) on the interface to forward the first packet.

Specifically, the first network device may forward the first packet based on a preset mapping table and the algorithm identifier and the resource identifier of the first packet. The mapping table in the first network device may include a mapping relationship between a pair of the algorithm identifier and the resource identifier and a pair of the interface and the forwarding resource of the interface. Alternatively, the mapping table in the first network device may include a plurality of mapping sub-tables, where the plurality of mapping sub-tables respectively include a mapping relationship between the algorithm identifier and the interface and a mapping relationship between the resource identifier and the forwarding resource. For a process in which the first network device forwards the first packet based on the mapping table, refer to Scenario 1. Details are not described herein again.

Figures 4B, 5A:
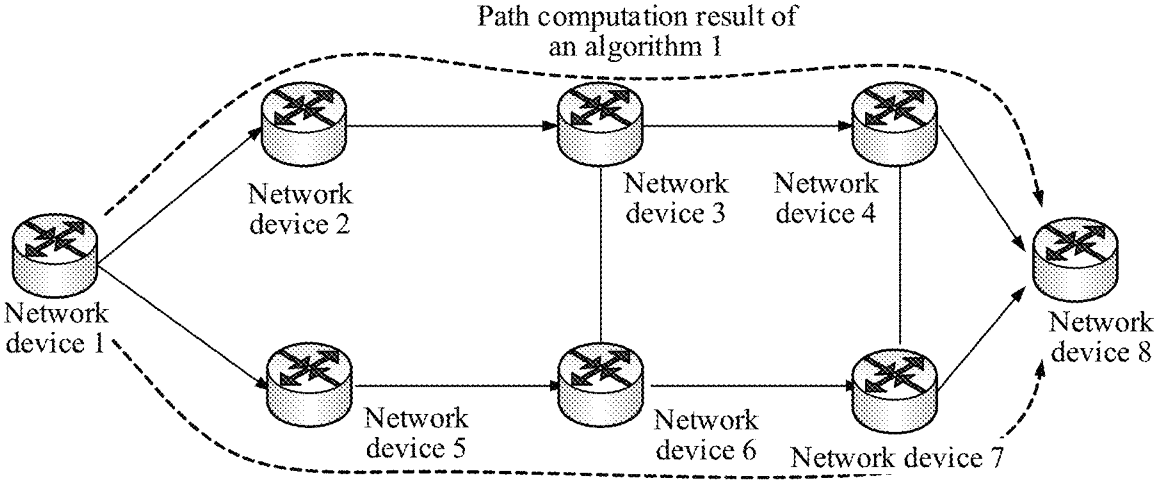
FIG. 4*b* is a schematic diagram of another packet forwarding according to an embodiment of this application.
FIG. 5*a* is a schematic structural diagram of a slice identifier according to an embodiment of this application.

For example, FIG. 4*b* is a schematic diagram of another packet forwarding according to an embodiment of this application. As shown in FIG. 4*b*, the network structure in FIG. 4*b* may perform path computation for the packet through different path computation algorithms. It is assumed that the network device 1 obtains the packet, and the destination node of the packet is the network device 8. When the network device calculates the forwarding path of the packet through the algorithm 1, the forwarding path of the packet obtained through calculation is: the network device 1> the network device 2> the network device 3> the network device 4> the network device 8. When the network device calculates the forwarding path of the packet through the algorithm 2, the forwarding path of the packet obtained through calculation is: the network device 1> the network device 5> the network device 6> the network device 7> the network device 8.

It is assumed that the packet obtained by the network device 1 includes the algorithm identifier and the resource identifier, the path computation algorithm indicated by the algorithm identifier is the algorithm 1, and the forwarding resource indicated by the resource identifier is the queue 2. In this case, the network device 1 determines, based on the algorithm identifier and the resource identifier in the packet, that the interface for forwarding the packet is the interface between the network device 1 and the network device 2. Further, the network device 1 determines, based on the resource identifier in the packet, to finally use the queue 2 corresponding to the interface between the network device 1 and the network device 2 to forward the packet.

In Scenario 2, the algorithm identifier and the resource identifier are carried in the packet to indicate the network slice to which the packet belongs. Network slices having different topologies and different forwarding resources can use same information to identify the same destination node, thereby avoiding planning more destination node information for the slices. In addition, the algorithm identifier and the resource identifier are separately carried. A plurality of slices having a same path computation algorithm can be forwarded through forwarding entries of a same algorithm, thereby reducing the possibility of an increase in a quantity of the forwarding entries caused by slices.

Scenario 3: The plurality of sub-identifiers in the first slice identifier include a topology identifier, an algorithm identifier, and a resource identifier.

FIG. 5*a* is a schematic structural diagram of a slice identifier according to an embodiment of this application. As shown in FIG. 5*a*, the first slice identifier includes the topology identifier, the algorithm identifier, and the resource identifier. For a detailed description of the topology identifier, the algorithm identifier, and the resource identifier, refer to the foregoing embodiments. Details are not described herein again.

In Scenario 3, the network domain where the first network device is located may divide topologies of the network slices in the network domain via a multi-topology technology, and define a path computation constraint of the network slice in the network domain through the path computation algorithm such as a flexible algorithm (Flex-Algo) or another specific algorithm. In brief, the network domain where the first network device is located includes the plurality of topologies, and one or more path computation algorithms may be used in each topology to perform the path computation.

Different network slices in the network domain where the first network device is located may correspond to different topologies, or different network slices may respectively perform path computation through different path computation algorithms. Different network slices in the network domain may alternatively correspond to the same topology and the same path computation algorithm. However, forwarding resources allocated to different network slices by the network device are different, and the network device may distinguish the forwarding resources allocated to the different network slices based on the resource identifiers.

In a possible implementation, when the first slice identifier includes the topology identifier, the algorithm identifier, and the resource identifier, a process in which the first network device forwards the first packet based on the first slice identifier is specifically as follows: The first network device first determines, based on information indicating a forwarding path (for example, the destination address, the MPLS label, or the SID) in the first packet, a destination node of the first packet. Then, the first network device determines, based on the topology identifier in the first packet, a topology for reaching the destination node, and determines, based on the algorithm identifier in the first packet, a path computation algorithm for reaching the destination node, to obtain the interface for forwarding the packet. Finally, the first network device determines, based on the resource identifier in the first packet, the corresponding forwarding resource (for example, a logical sub-interface or a queue) on the interface to forward the first packet.

Specifically, the first network device may forward the first packet based on a preset mapping table and the topology identifier, the algorithm identifier, and the resource identifier of the first packet. The mapping table in the first network device may include a mapping relationship between a combination of the topology identifier, the algorithm identifier, and the resource identifier and a pair of the interface and the forwarding resource of the interface. Alternatively, the mapping table in the first network device may include a plurality of mapping sub-tables, where the plurality of mapping sub-tables respectively include a mapping relationship between the topology identifier and the interface, a mapping relationship between the algorithm identifier and the interface, and a mapping relationship between the resource identifier and the forwarding resource. For a process in which the first network device forwards the first packet based on the mapping table, refer to Scenario 1. Details are not described herein again.

Figure 5B:
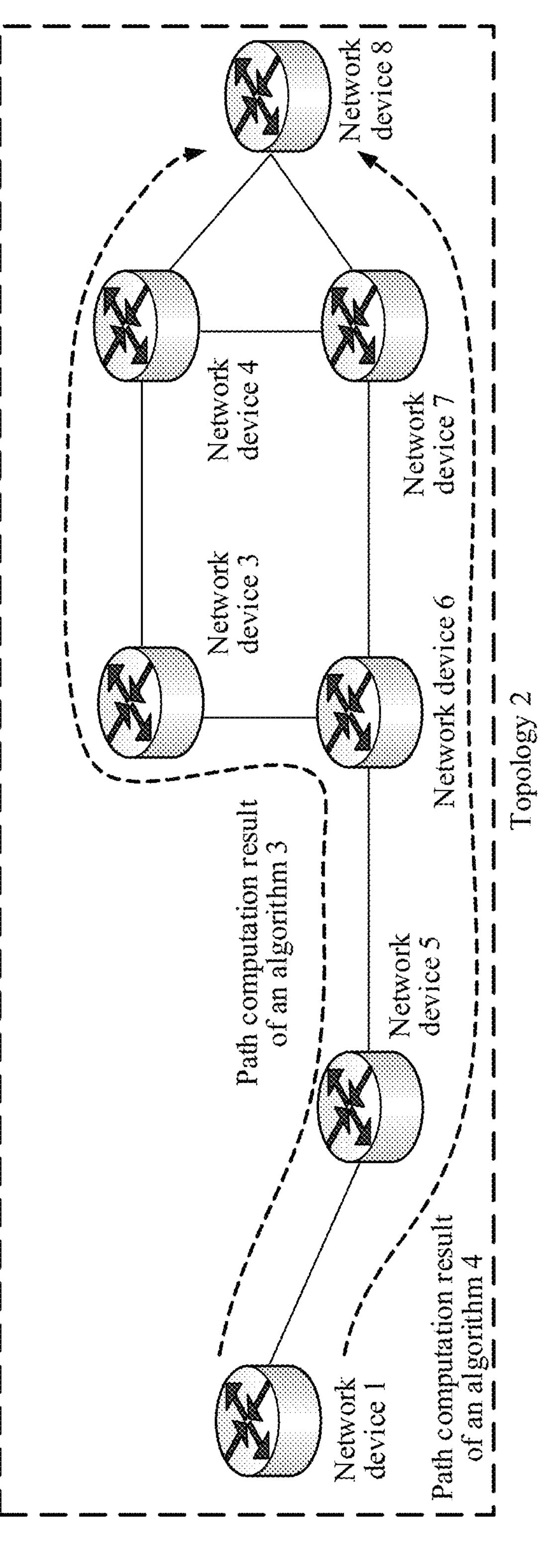
FIG. 5*b* is a schematic diagram of another packet forwarding according to an embodiment of this application.

For example, FIG. 5*b* is a schematic diagram of another packet forwarding according to an embodiment of this application. As shown in FIG. 5*b*, the network structure in FIG. 5*b* is divided into two different topologies (that is, the topology 1 and the topology 2), and performs path computation for the packet through different path computation algorithms. The topology 1 includes a network device 1, a network device 2, a network device 3, a network device 4, a network device 6, a network device 7, and a network device 8. The topology 2 includes a network device 1, a network device 3, a network device 4, a network device 5, a network device 6, a network device 7, and a network device 8.

It is assumed that the network device 1 obtains the packet, and the destination node of the packet is the network device 8.

When the topology identifier in the packet indicates the topology 1, and the algorithm identifier in the packet indicates the algorithm 1, the forwarding path of the packet obtained by the network device through calculation based on the topology identifier and the algorithm identifier is: the network device 1> the network device 2> the network device 3> the network device 4> the network device 8.

When the topology identifier in the packet indicates the topology 1, and the algorithm identifier in the packet indicates the algorithm 2, the forwarding path of the packet obtained by the network device through calculation based on the topology identifier and the algorithm identifier is: the network device 1> the network device 2> the network device 3> the network device 6> the network device 7> the network device 8.

When the topology identifier in the packet indicates the topology 2, and the algorithm identifier in the packet indicates the algorithm 3, the forwarding path of the packet obtained by the network device through calculation based on the topology identifier and the algorithm identifier is: the network device 1> the network device 5> the network device 6> the network device 3> the network device 4> the network device 8.

When the topology identifier in the packet indicates the topology 2, and the algorithm identifier in the packet indicates the algorithm 4, the forwarding path of the packet obtained by the network device through calculation based on the topology identifier and the algorithm identifier is: the network device 1> the network device 5> the network device 6> the network device 7> the network device 8.

The algorithm 1 and the algorithm 2 are path computation algorithms of different types. In addition, the algorithm 3 and the algorithm 4 are path computation algorithms of different types. The algorithm 1 and the algorithm 3 or the algorithm 4 may be path computation algorithms of different types, or may be path computation algorithms of a same type.

It is assumed that the packet obtained by the network device 1 includes the topology identifier, the algorithm identifier, and the resource identifier, the topology indicated by the topology identifier is the topology 1, the path computation algorithm indicated by the algorithm identifier is the algorithm 1, and the forwarding resource indicated by the resource identifier is the queue 2. In this case, the network device 1 determines, based on the topology identifier, the algorithm identifier and the resource identifier in the packet, that the interface for forwarding the packet is the interface between the network device 1 and the network device 2. Further, the network device 1 determines, based on the resource identifier in the packet, to finally use the queue 2 corresponding to the interface between the network device 1 and the network device 2 to forward the packet.

In Scenario 3, the topology identifier, the algorithm identifier, and the resource identifier are carried in the packet. Network slices having different topologies, using different algorithms, and having different resources can use same information to identify the same destination node, thereby avoiding planning more destination node information for the slices. In addition, the topology identifier, the algorithm identifier, and the resource identifier are separately carried. A plurality of slices having a same topology or algorithm can be forwarded through forwarding entries of a same topology or algorithm, thereby reducing the possibility of an increase in a quantity of the forwarding entries caused by slices.

In an embodiment, in Scenario 3, different forwarding policies may be configured on different network devices in a same network domain, to enable the different network devices to forward the packet based on different sub-identifiers in the slice identifier. In brief, for network devices in the same network domain, the network devices may forward the packet based on all sub-identifiers in the slice identifier, or the network devices may forward the packet based on some sub-identifiers in the slice identifier. In an actual forwarding process, the network device may determine, based on the configured forwarding policy, the sub-identifier in the slice identifier that guides packet forwarding, and then forward the packet based on the sub-identifiers that guide packet forwarding.

Figure 5C:
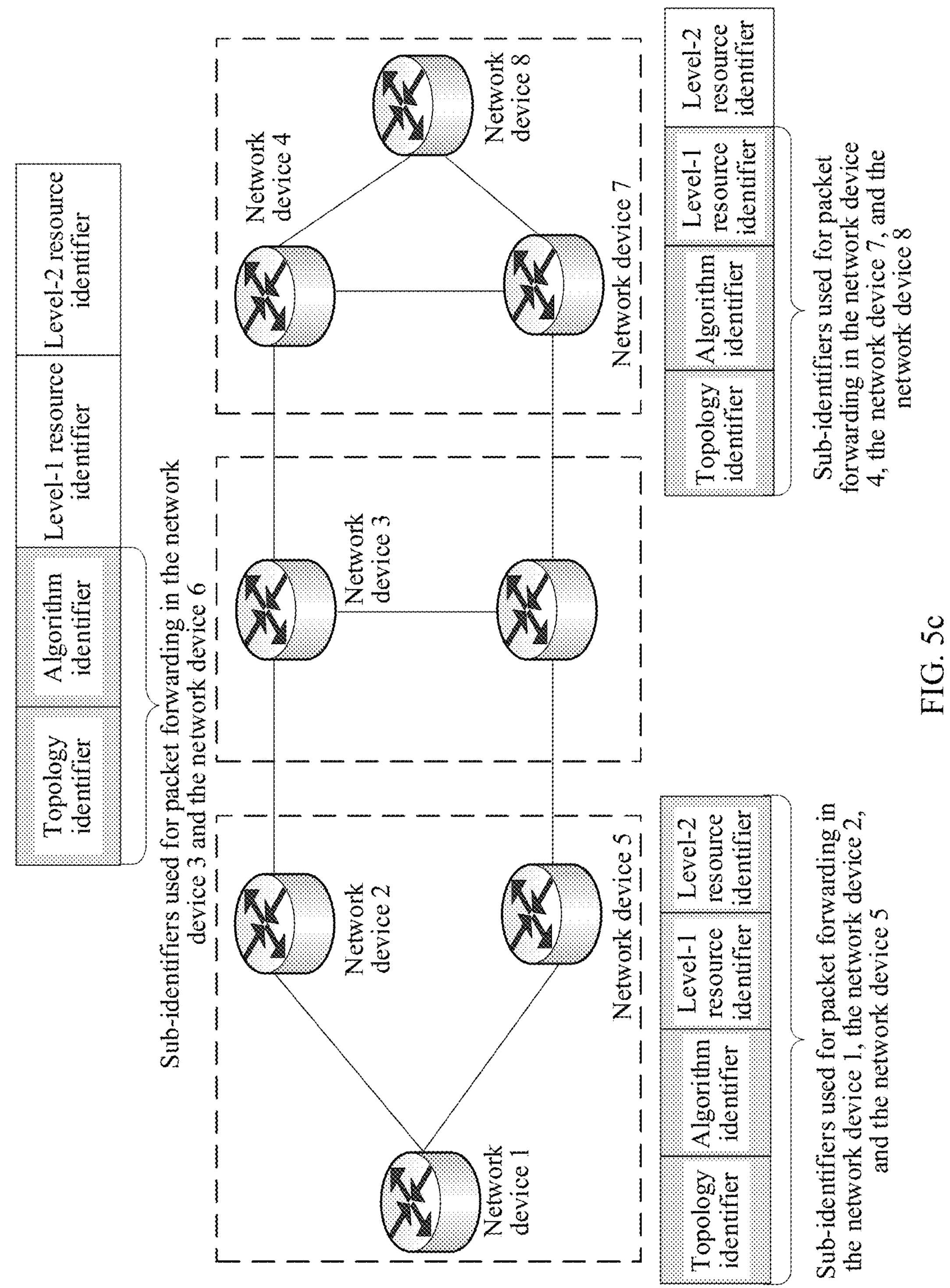
FIG. 5*c* is a schematic diagram of forwarding a packet by a network device based on a slice identifier according to an embodiment of this application.

For example, FIG. 5*c* is a schematic diagram of forwarding a packet by a network device based on a slice identifier according to an embodiment of this application. The network structure shown in FIG. 5*c* includes a network device 1 to a network device 8, and a slice identifier carried in a forwarded packet in the network structure includes a topology identifier, an algorithm identifier, a level-1 resource identifier, and a level-2 resource identifier.

In the network structure, the network device 1, the network device 2, and the network device 5 support a relatively fine slice granularity, and support allocation of fine-grained resources to different slices on a same node or link. Therefore, the network device 1, the network device 2, and the network device 5 may use all sub-identifiers (that is, the topology identifier, the algorithm identifier, the level-1 resource identifier, and the level-2 resource identifier) in the slice identifier to forward the packet. Specifically, the network device 1, the network device 2, and the network device 5 may determine the topology and the path computation algorithm of the slice based on the topology identifier and the algorithm identifier, to perform path computation in a specified topology through a corresponding path computation algorithm, to obtain the interface for forwarding the packet. Then, the level-1 resource identifier and the level-2 resource identifier are used to determine the resource allocated to the slice, to finally implement packet forwarding.

In the network structure, the network device 3 and the network device 6 do not support allocation of fine-grained resources to different slices on a same node or link. Therefore, the network device 3 and the network device 6 may use some of the sub-identifiers in the slice identifier, that is, the topology identifier and the algorithm identifier, to forward the packet. Specifically, the network device 3 and the network device 6 may determine the topology and the path computation algorithm of the slice based on the topology identifier and the algorithm identifier, to perform path computation in a specified topology through a corresponding path computation algorithm, to obtain the interface for forwarding the packet, and forward the packet based on the interface.

In the network structure, the network device 4, the network device 7, and the network device 8 support allocation of fine-grained resources to different slices on a same node or link, but a resource allocation granularity is relatively coarse. Therefore, the network device 4, the network device 7, and the network device 8 may use the topology identifier, the algorithm identifier, and the level-1 resource identifier in the slice identifier to forward the packet. Specifically, the network device 4, the network device 7, and the network device 8 may determine the topology and the path computation algorithm of the slice based on the topology identifier and the algorithm identifier, to perform path computation in a specified topology through a corresponding path computation algorithm, to obtain the interface for forwarding the packet. Then, the level-1 resource identifier is used to determine the resource allocated to the slice, to finally implement packet forwarding.

In this embodiment, different forwarding policies are configured on different network devices, to enable network devices having different forwarding capabilities in the same network domain to implement packet forwarding based on the same slice identifier, thereby ensuring normal packet forwarding.

Scenario 4: The plurality of sub-identifiers in the first slice identifier include a domain identifier and a resource identifier.

FIG. 6 is a schematic structural diagram of another slice identifier according to an embodiment of this application. As shown in FIG. 6, the first slice identifier includes the domain identifier and the resource identifier. The domain identifier indicates the network domain in which the first slice identifier is effective. The resource identifier indicates the forwarding resource of the first network slice.

In an embodiment, the domain identifier may be a global identifier, that is, the domain identifier indicates that network domains in which the first slice identifier is effective are all network domains in the bearer network. For example, the domain identifier may be a default value and the default value indicates that the network domains in which the slice identifier is effective are all network domains in the bearer network. When the domain identifier indicates that the network domains in which the first slice identifier is effective are all network domains in the bearer network, the resource identifier may be a resource identifier that is effective globally. That is, all network devices in all network domains in the bearer network may forward the packet based on the resource identifier.

In an embodiment, the domain identifier may be an area identifier, that is, the domain identifier indicates that network domains in which the first slice identifier is effective are some network domains in the bearer network. For example, when a value of the domain identifier is 1, the domain identifier indicates that the network domain in which the first slice identifier is effective is the first network domain in the bearer network. When a value of the domain identifier is 2, the domain identifier indicates that the network domain in which the first slice identifier is effective is the second network domain in the bearer network. When the domain identifier indicates that the network domains in which the first slice identifier is effective are some network domains in the bearer network, the resource identifier may be a resource identifier that is effective in specific areas. In other words, the resource identifier is effective only in the network domains indicated by the domain identifier.

A manner of combining sub-identifiers including the domain identifier and the resource identifier in the slice identifier is applicable to a network slicing scenario that crosses a plurality of network domains. In this scenario, network slices in each network domain may use different domain identifiers and resource identifiers. Network slices in the plurality of network domains are combined to form a cross-domain network slice.

In a possible implementation, when the slice identifier includes the domain identifier and the resource identifier, a process in which the network device forwards the packet based on the slice identifier is specifically described as follows:

A network device located at the boundary of the network domain receives a packet, where the packet may include a domain identifier and a resource identifier. The network device determines, based on the mapping relationship maintained locally and the domain identifier in the packet, the domain identifier and the resource identifier that are effective in the current network domain, and updates the slice identifier in the packet, or adds the slice identifier that is effective in the current network domain to the packet. Then, the network device determines the destination node of the packet based on the path indication information such as the destination IP address, the MPLS label, or the SID in the packet, and determines the interface for reaching the destination node based on the default topology and the default algorithm. Finally, the network device determines, based on the resource identifier, to forward the packet through the corresponding forwarding resource on the interface.

After a network device located in the network domain receives the packet including the domain identifier and the resource identifier, the network device determines the destination node of the packet based on the path indication information such as the destination IP address, the MPLS label, or the SID in the packet, and determines the interface for reaching the destination node based on the default topology and the default algorithm. Finally, the network device determines, based on the resource identifier, to forward the packet through the corresponding forwarding resource on the interface.

Scenario 5: The plurality of sub-identifiers in the first slice identifier include a domain identifier and a resource identifier, and the plurality of sub-identifiers further include one or more of a topology identifier and an algorithm identifier.

In brief, in Scenario 5, a plurality of manners are used to combine the plurality of sub-identifiers in the first slice identifier.

FIG. 7 is another schematic structural diagram of a first slice identifier according to an embodiment of this application.

In Manner 1, the plurality of sub-identifiers in the first slice identifier include a domain identifier, a topology identifier, and a resource identifier.

In Manner 2, the plurality of sub-identifiers in the first slice identifier include a domain identifier, an algorithm identifier, and a resource identifier.

In Manner 3, the plurality of sub-identifiers in the first slice identifier include a domain identifier, a topology identifier, an algorithm identifier, and a resource identifier.

For a detailed description of the domain identifier, the topology identifier, the algorithm identifier, and the resource identifier, refer to the foregoing embodiments. Details are not described herein again.

The plurality of manners of combination of sub-identifiers shown in FIG. 7 are applicable to a network slicing scenario that crosses a plurality of network domains. In this scenario, network slices in each network domain may use different domain identifiers, and the topology identifier, the algorithm identifier, and the resource identifier corresponding to each of the network slices may also be different. Network slices in the plurality of network domains are combined to form a cross-domain network slice.

Scenario 6: Based on Scenario 1 to Scenario 5, the plurality of sub-identifiers in the first slice identifier further include a flag bit identifier.

In brief, based on the plurality of manners of combination of sub-identifiers corresponding to Scenario 1 to Scenario 5, the first slice identifier further includes the flag bit identifier. For example, based on Scenario 1, in addition to the topology identifier and the resource identifier, the first slice identifier further includes the flag bit identifier. For another example, based on Manner 3 in Scenario 5, in addition to the domain identifier, the topology identifier, the algorithm identifier, and the resource identifier, the first slice identifier further includes the flag bit identifier. FIG. 8 is a schematic structural diagram of a first slice identifier according to an embodiment of this application. In FIG. 8, the first slice identifier includes the domain identifier, the topology identifier, the algorithm identifier, the resource identifier, and the flag bit identifier.

In this embodiment, the flag bit identifier indicates a sub-identifier that guides forwarding in the first slice identifier and a forwarding policy corresponding to the first slice identifier. The sub-identifier that guides forwarding is a sub-identifier that is selected by the network device to guide packet forwarding in the first slice identifier. The sub-identifier that guides forwarding may be one or more sub-identifiers other than the flag bit identifier in the first slice identifier. For example, when the first slice identifier includes the domain identifier, the topology identifier, the algorithm identifier, the resource identifier, and the flag bit identifier, the sub-identifier that guides forwarding may be the topology identifier and the algorithm identifier; or the sub-identifier that guides forwarding may be the topology identifier, the algorithm identifier, and the resource identifier. In brief, the flag bit identifier indicates which sub-identifiers in the slice identifier need to be used by the network device for packet forwarding.

The forwarding policy indicated by the flag bit identifier indicates a forwarding behavior after an interface is determined based on the sub-identifier that guides forwarding. Specifically, the forwarding behavior may be: If the first network device cannot find, based on the first slice identifier, the interface for forwarding, the first network device may skip determining, based on the first slice identifier, the interface for forwarding, and the first network device may forward the packet based on a default slice; or if the first network device cannot find, based on the first slice identifier, the interface for forwarding, the first network device discards the first packet.

The foregoing embodiments describe a process in which the network device performs packet forwarding in the same network domain. The following describes a process in which the network device performs packet forwarding in a cross-domain scenario.

In the cross-domain scenario, the first network device is a boundary device of the network domain. The first network device receives a packet from another network domain, and updates the received packet, so that the updated packet carries the first slice identifier. Then, the first network device forwards the packet based on the updated packet.

For ease of understanding, the following separately describes a plurality of cross-domain scenarios according to this embodiment.

Cross-domain scenario 1: The first network device is located in a first network domain in a bearer network. The first network device receives a packet sent by a network device in a second network domain in the bearer network, and the packet carries a slice identifier that is effective in the second network domain.

In the cross-domain scenario 1, the first network device serves as a boundary node between the first network domain and the second network domain. The first network device updates the packet received in the second network domain to obtain an updated packet. The network domain generated by the updated packet is the first network domain.

For example, a mapping relationship between slice identifiers of different network domains is pre-configured in the first network device. Based on the mapping relationship, the first network device can convert a slice identifier that is effective in the second network domain into a slice identifier that is effective in the first network domain. Specifically, the first network device receives the second packet sent by the second network device, where the second packet includes the second slice identifier, and the second slice identifier includes the plurality of sub-identifiers. Then, the first network device updates the second slice identifier in the second packet to the first slice identifier based on the pre-configured mapping relationship, to obtain the first packet. The first slice identifier is effective in the first network domain, and indicates the first network slice in the first network domain. The second slice identifier is effective in the second network domain, and indicates the second network slice in the second network domain. A service-level agreement (SLA) of the first network slice is the same as an SLA of the second network slice. In other words, network quality of the first network slice is the same as network quality of the second network slice. Finally, the first network device forwards the first packet based on the first slice identifier.

Figure 9A:
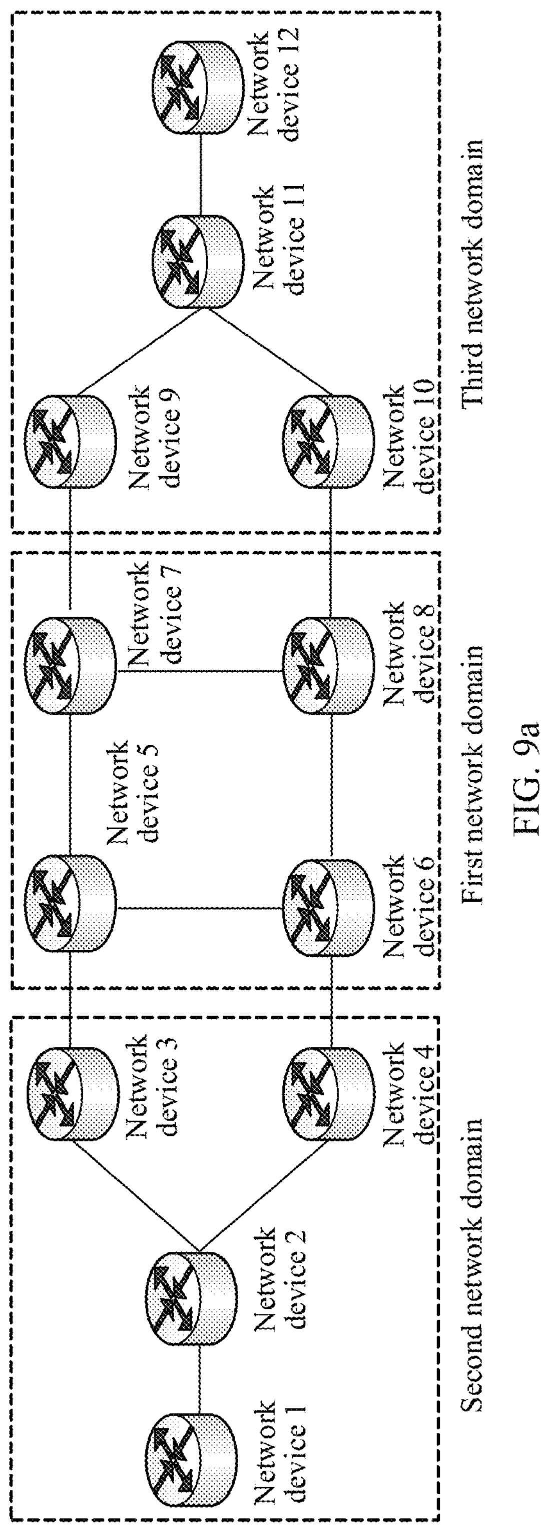
FIG. 9*a* is a schematic diagram of network domain division according to an embodiment of this application.

FIG. 9*a* is a schematic diagram of network domain division according to an embodiment of this application. In FIG. 9*a*, a network device 1, a network device 2, a network device 3, and a network device 4 are located in the second network domain; a network device 5, a network device 6, a network device 7, and a network device 8 are located in the first network domain; and a network device 9, a network device 10, a network device 11, and a network device 12 are located in the third network domain. The network device 5 and the network device 6 in the first network domain are domain boundary nodes. After receiving a packet from the second network domain, the network device 5 and the network device 6 need to update the received packet, to obtain an updated packet that is effective in the first network domain.

In a cross-domain scenario, network devices in different network domains may forward packets based on different sub-identifier combinations. In brief, the network device in each network domain may select, based on the forwarding policy in the current network domain, one or more sub-identifiers in the packet to determine the interface for forwarding the packet, to implement packet forwarding.

Figure 9B:
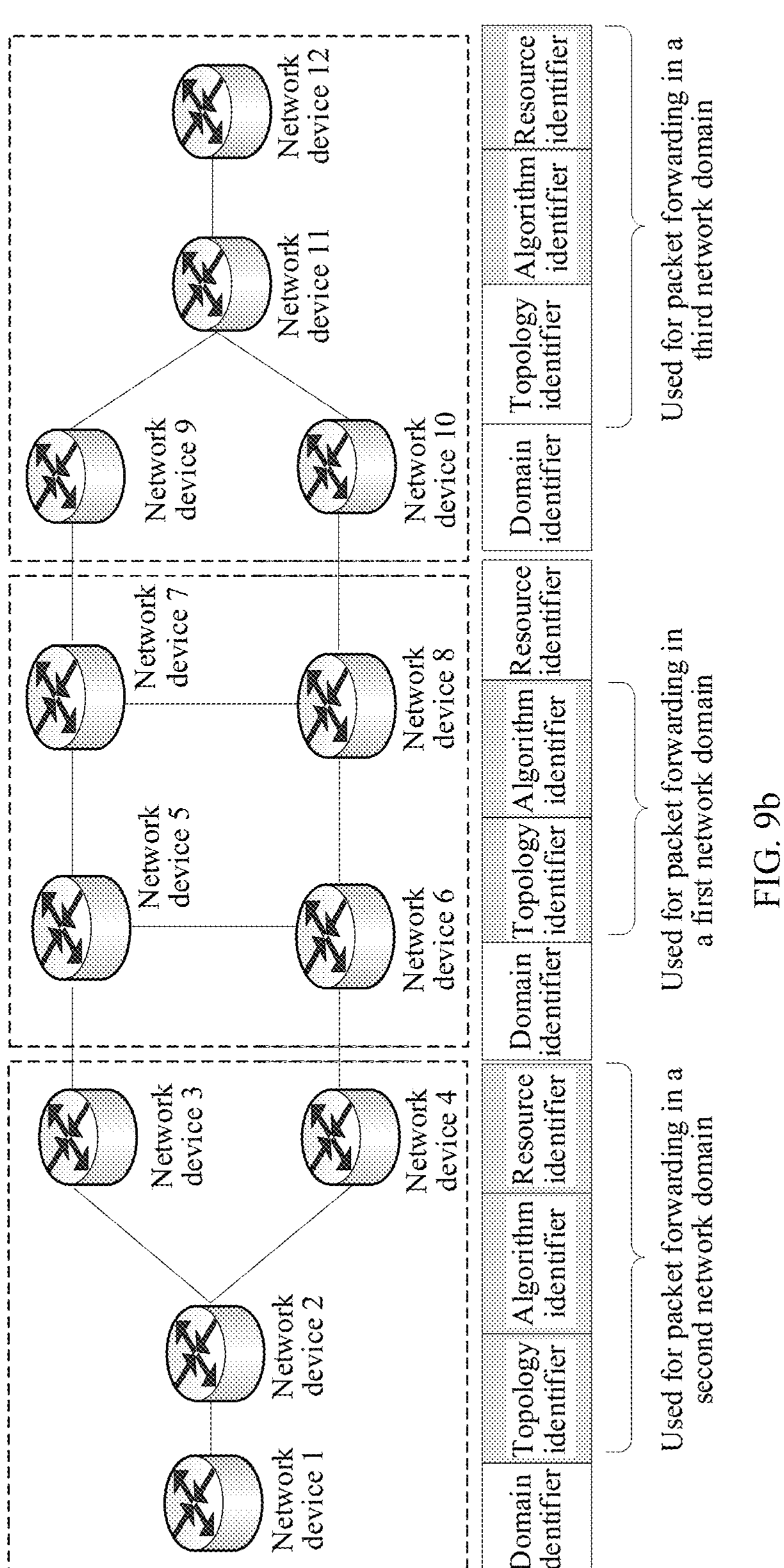
FIG. 9*b* is a schematic diagram of another network domain division according to an embodiment of this application.

For example, FIG. 9*b* is a schematic diagram of network domain division according to an embodiment of this application. When forwarding a packet, the network device 1, the network device 2, the network device 3, and the network device 4 in the second network domain select the topology identifier, the algorithm identifier, and the resource identifier in the slice identifier to determine the interface of the packet, and forward the packet based on the obtained interface.

When forwarding a packet, the network device 5, the network device 6, the network device 7, and the network device 8 in the first network domain select the topology identifier and the algorithm identifier in the slice identifier to determine the interface of the packet, and forward the packet based on the obtained interface.

When forwarding a packet, the network device 9, the network device 10, the network device 11, and the network device 12 in the third network domain select the algorithm identifier and the resource identifier in the slice identifier to determine the interface of the packet, and forward the packet based on the obtained interface.

Cross-domain scenario 2: The first network device is a boundary node in a bearer network. The first network device receives a packet sent by a network device in a network outside the bearer network, where the packet carries a slice identifier of an entire network.

In a possible example, the first network device may receive a second packet sent by a network device in an access network or a core network, where the packet carries a second slice identifier, and the second slice identifier is effective in the entire network. In other words, the second slice identifier is effective in the access network, the bearer network, and the core network. The first network device updates the second slice identifier to the first slice identifier, to obtain the first packet.

For example, the second slice identifier is single network slice selection assistance information (S-NSSAI) or an application-aware networking (APN) identifier. For another example, the second slice identifier can indicate a network slice to which the second packet belongs in the plurality of network domains of the entire bearer network. A format of the second slice identifier may be the same as a format of the first slice identifier. The format of the second slice identifier may also be different from the format of the first slice identifier. In this way, the first network device can convert the second slice identifier that is effective in the plurality of network domains into the first slice identifier that is effective in the network domain where the first network device is located.

In another possible example, the first network device receives a third packet, and determines the network slice to which the third packet belongs. Then, the first network device adds, based on the network slice to which the third packet belongs, the first slice identifier to the third packet, to obtain the first packet. The third packet includes a third slice identifier, and the third slice identifier identifies, in the bearer network including the plurality of network domains, the network slice to which the third packet belongs. The third slice identifier may be S-NSSAI or an APN identifier. Alternatively, a format of the third slice identifier may be the same as the format of the first slice identifier. The third slice identifier includes a plurality of sub-identifiers, and the third slice identifier can indicate a network slice to which the third packet belongs in the plurality of network domains of the entire bearer network.

In brief, the third slice identifier in the third packet is a global identifier in the bearer network, and is effective in the plurality of network domains of the entire bearer network. In other words, the third slice identifier can identify, in the plurality of network domains of the bearer network, the network slice to which the third packet belongs.

Therefore, the first network device may determine, based on the third slice identifier, the network slice to which the third packet belongs, to obtain the first slice identifier that is effective in the network domain where the first network device is located. Then, the first network device adds the first slice identifier to the third packet to obtain the first packet. The first packet includes both the third slice identifier and the first slice identifier.

Cross-domain scenario 3: The first network device is located in a network domain in a bearer network. The first network device receives a packet sent by a network device outside the network domain, and the packet does not carry a slice identifier.

In a possible example, the first network device receives a third packet, and determines the network slice to which the third packet belongs. The third packet is from a network device outside the network domain to which the first network device belongs, and the third packet does not carry a slice identifier. Then, the first network device adds, based on the network slice to which the third packet belongs, the first slice identifier to the third packet, to obtain the first packet.

In an embodiment, the first network device may further add, based on the network slice to which the third packet belongs, both the first slice identifier and the fourth slice identifier to the third packet, to obtain the first packet. The fourth slice identifier identifies, in a bearer network including a plurality of network domains, the network slice to which the third packet belongs. In other words, the first packet generated by the first network device includes the first slice identifier and the fourth slice identifier. The first slice identifier is effective only in the network domain where the first network device is located, and indicates a network device in the network domain where the first network device is located to forward a packet. The fourth slice identifier is effective in a plurality of network domains, and indicates a boundary node in the network domain to update a slice identifier that is effective in a single network domain.

Specifically, the policy used to determine the network slice may be pre-configured in the first network device. The first network device may determine, based on information in the third packet and under the policy, the network slice to which the third packet belongs. The information in the third packet includes one or more of the following information: a source address, a destination address, a protocol number, a differentiated services code point (DSCP) field, a traffic class field, a virtual local area network identifier (VLAN ID), and a port number.

The source address may be, for example, an Internet protocol (IP) address or a source media access control (MAC) address for sending the packet, for example, an address of a user host or a base station. The destination address may be, for example, a destination IP address or a destination MAC address of the packet. The first network device may alternatively determine, based on some other fields in the third packet, the network slice to which the third packet belongs. For example, a DSCP field or a TC field in an IPv4 or IPv6 packet header in the third packet, or a VLAN ID in an Ethernet header. The first network device may specifically determine, based on a field (for example, a source address, a destination address, a protocol number, a DSCP field, or a TC field) in the foregoing fields or a combination of several fields, the network slice to which the third packet belongs.

Cross-domain scenario 4: The first network device is located in a network domain in a bearer network. The first network device receives a packet sent by a network device outside the network domain. The packet includes a slice identifier that is effective in a plurality of network domains and a slice identifier that is effective only in a previous network domain of the network domain where the first network is located.

For example, the first network device receives a third packet, and determines the network slice to which the third packet belongs. The third packet is from a network device outside the network domain to which the first network device belongs. The third packet carries two slice identifiers: the third slice identifier and the fourth slice identifier. The third slice identifier carried in the third packet is effective in the bearer network including the plurality of network domains. The fourth slice identifier is effective only in a previous network domain of the network domain where the first network is located.

Then, the first network device determines, based on the third slice identifier, the network slice to which the third packet belongs, and updates the fourth slice identifier in the third packet to the first slice identifier, to obtain the first packet including the third slice identifier and the first slice identifier.

In brief, the packet forwarded in the bearer network including the plurality of network domains includes two slice identifiers. One slice identifier is effective in the plurality of network domains, and indicates the boundary node in the network domain to update the slice identifier that is effective in the single network domain. The other slice identifier is effective only in one network domain, and indicates the network device in the current network domain to forward the packet.

Figure 10:
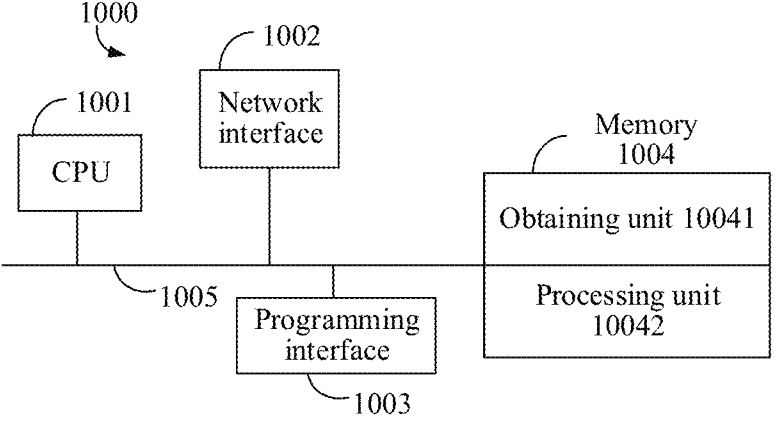
FIG. 10 is a schematic structural diagram of a network device 1000 according to an embodiment of this application.

To implement the foregoing embodiments, this application further provides a network device. FIG. 10 is a schematic structural diagram of a network device 1000 according to an embodiment of this application.

Although the network device 1000 shown in FIG. 10 shows some specific features, a person skilled in the art may be aware from embodiments of this application that, for brevity, FIG. 10 does not show various other features, to avoid confusing more related aspects of the implementations disclosed in embodiments of this application. For this purpose, as an example, in some embodiments, the network device 1000 includes one or more processing units (CPU) 1001, a network interface 1002, a programming interface 1003, a memory 1004, and one or more communication buses 1005 that are configured to interconnect various components. In some other implementations, some functional components or units may be omitted or added to the network device 1000 according to the foregoing example.

In some embodiments, among others, the network interface 1002 is configured to connect to one or more other network devices/servers in the network system. In some embodiments, the communication bus 1005 includes a circuit that interconnects and controls communication between system components. The memory 1004 may include a non-volatile memory, for example, a read-only memory (ROM), a programmable read-only memory (PROM), an erasable programmable read-only memory (EPROM), an electrically erasable programmable read-only memory (EEPROM), or a flash memory. Alternatively, the memory 1004 may include a volatile memory. The volatile memory may be a random access memory (RAM), and is used as an external cache.

In some embodiments, the memory 1004 or a non-transitory computer-readable storage medium of the memory 1004 stores the following programs, modules, and data structures, or a subset thereof, for example, including a transceiver unit (not shown), an obtaining unit 10041, and a processing unit 10042.

In a possible embodiment, the network device 1000 may have any function of the network device 2 in the method embodiment corresponding to FIG. 2.

It should be understood that the network device 1000 corresponds to the first network device in the method embodiment. The modules and the foregoing other operations and/or functions in the network device 1000 are separately configured to implement various steps and methods implemented by the first network device in the method embodiment. For specific details, refer to the method embodiment corresponding to FIG. 2. For brevity, details are not described herein again.

It should be understood that the foregoing function of the transceiver unit may be implemented by the processor through invoking program code in the memory, and cooperation with the network interface 1002 is performed when needed. Alternatively, a data receiving/sending operation may be executed by the network interface 1002 on the network device 1000.

In various implementations, the network device 1000 is configured to perform the packet processing method according to embodiments of this application, for example, perform the packet processing method corresponding to the embodiment shown in FIG. 2.

In correspondence to the method embodiments and the virtual apparatus embodiments provided in this application, an embodiment of this application further provides a network device. The following describes a hardware structure of the network device.

Figure 11:
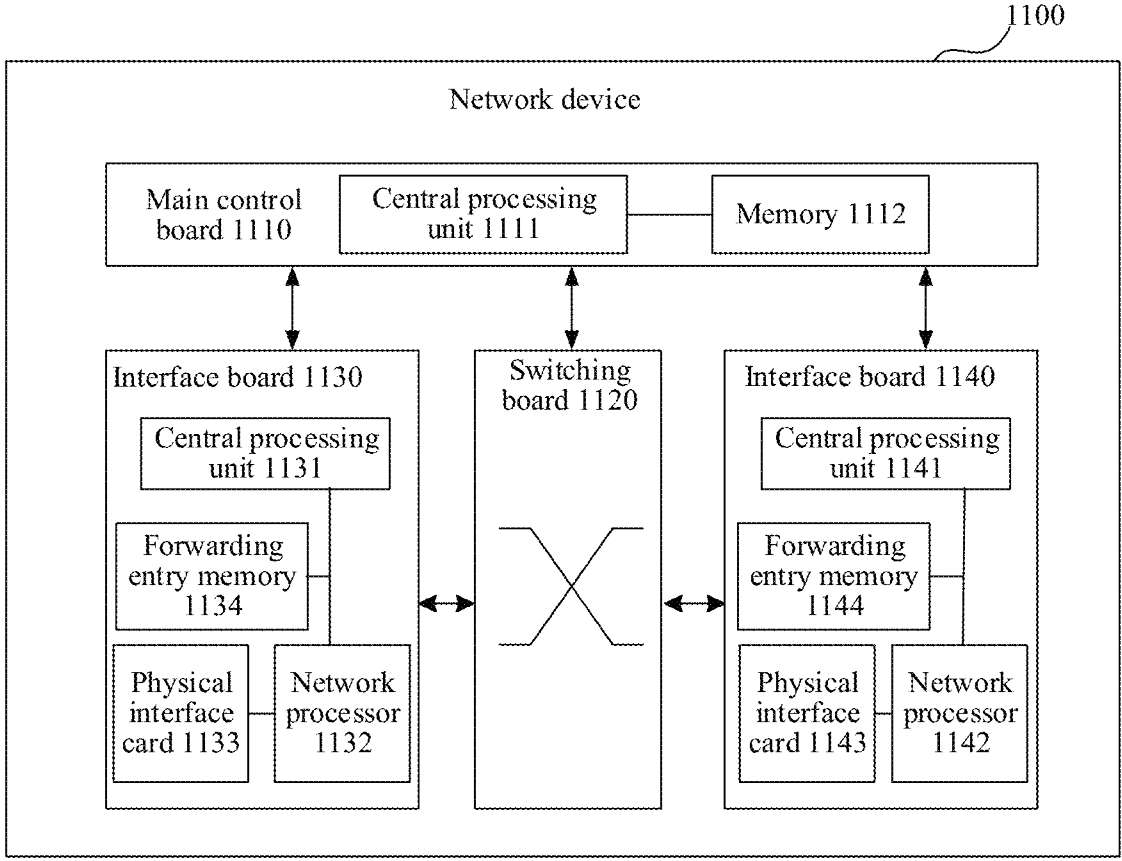
FIG. 11 is a schematic structural diagram of a network device 1100 according to an embodiment of this application.

FIG. 11 is a schematic structural diagram of a network device 1100 according to an embodiment of this application. The network device 1100 may be configured as the first network device in the method embodiment.

The network device 1100 may correspond to the first network device in the method embodiment. The hardware, the modules, and the other operations and/or functions in the network device 1100 are separately configured to implement the steps and the methods implemented by the first network device in the method embodiment. For a detailed process in which the network device 1100 forwards the packet, refer to the method embodiment. For brevity, details are not described herein again. Steps in the method embodiment corresponding to FIG. 2 are executed through an integrated logic circuit of hardware in the processor of the network device 1100, or through instructions in a form of software. The steps of the method disclosed with reference to embodiments of this application may be directly performed by a hardware processor, or may be performed through a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

The network device 1100 may also correspond to the network device 1100 in the foregoing virtual apparatus embodiment, and each functional module in the network device 1100 is implemented through software and hardware of the network device 1100. In a possible implementation, the functional modules included in the network device 1100 are generated after the processor of the network device 1100 reading program code stored in the memory, or are jointly implemented by the processor of the network device 1100 in cooperation with a communication interface after reading program code stored in the memory.

The network device 1100 includes a main control board 1110 and an interface board 1130.

The main control board 1110 is also referred to as a main processing unit (MPU) or a route processor card. The main control board 1110 controls and manages components in the network device 1100, including route calculation, device management, device maintenance, and protocol processing functions. The main control board 1110 includes a central processing unit 1111 and a memory 1112.

The interface board 1130 is also referred to as a line processing unit (LPU), a line card, or a service board. The interface board 1130 is configured to provide various service interfaces, and forward a data packet. The service interfaces include but are not limited to Ethernet interfaces, POS (Packet over SONET/SDH) interfaces, and the like. The Ethernet interfaces are, for example, flexible Ethernet clients (FlexE Clients). The interface board 1130 includes a central processing unit 1131, a network processor 1132, a forwarding entry memory 1134, and a physical interface card (PIC) 1133.

The central processing unit 1131 on the interface board 1130 is configured to: control and manage the interface board 1130, and communicate with the central processing unit 1111 on the main control board 1110.

The network processor 1132 is configured to implement packet forwarding processing. A form of the network processor 1132 may be a forwarding chip. Specifically, processing on an uplink packet includes processing at a packet ingress interface and forwarding table lookup, and processing on a downlink packet includes forwarding table lookup and the like.

The physical interface card 1133 is configured to implement a physical layer interconnection function. Original traffic enters the interface board 1130 from the physical interface card, and a processed packet is sent from the physical interface card 1133. The physical interface card 1133 includes at least one physical interface, and the physical interface is also referred to as a physical port. The physical interface card 1133 corresponds to a FlexE physical interface in a system architecture. The physical interface card 1133, also referred to as a subcard, may be installed on the interface board 1130, and is responsible for converting an optical/electrical signal into a packet, performing validity check on the packet, and forwarding the packet to the network processor 1132 for processing. In some embodiments, the central processing unit 1131 of the interface board 1103 may also perform a function of the network processor 1132, for example, implement software forwarding based on a general-purpose CPU. Therefore, the network processor 1132 is not required in the physical interface card 1133.

In an embodiment, the network device 1100 includes a plurality of interface boards. For example, the network device 1100 further includes an interface board 1140. The interface board 1140 includes a central processing unit 1141, a network processor 1142, a forwarding entry memory 1144, and a physical interface card 1143.

In an embodiment, the network device 1100 further includes a switching board 1120. The switching board 1120 may also be referred to as a switch fabric unit (SFU). When the network device has a plurality of interface boards 1130, the switching board 1120 is configured to complete data exchange between the interface boards. For example, the interface board 1130 and the interface board 1140 may communicate with each other through the switching board 1120.

The main control board 1110 is coupled to the interface board 1130. For example, the main control board 1110, the interface board 1130 and the interface board 1140, and the switching board 1120 are connected to a system backboard through a system bus for interworking. In a possible implementation, an inter-process communication (IPC) channel is established between the main control board 1110 and the interface board 1130, and the main control board 1110 and the interface board 1130 communicate with each other through the IPC channel.

Logically, the network device 1100 includes a control plane and a forwarding plane. The control plane includes the main control board 1110 and the central processing unit 1131. The forwarding plane includes various components configured for forwarding, for example, the forwarding entry memory 1134, the physical interface card 1133, and the network processor 1132. The control plane performs functions such as routing, generating a forwarding table, processing signaling and a protocol packet, and configuring and maintaining a device status. The control plane delivers the generated forwarding table to the forwarding plane. On the forwarding plane, the network processor 1132 searches the forwarding table delivered by the control plane to forward a packet received by the physical interface card 1133. The forwarding table delivered by the control plane may be stored in the forwarding entry memory 1134. In some embodiments, the control plane and the forwarding plane may be completely separated, and are not on a same device.

It should be understood that the transceiver unit in the network device 1100 may be equivalent to the physical interface card 1133 or the physical interface card 1143 in the network device 1100. The obtaining unit 11041 and the processing unit 11042 in the network device 1100 may be equivalent to the central processing unit 1111 or the central processing unit 1131 in the network device 1100.

It can be understood that operations performed on the interface board 1140 are consistent with operations performed on the interface board 1130 in this embodiment of this application. For brevity, details are not described again. It should be understood that the network device 1100 in this embodiment may correspond to the first network device in the foregoing method embodiments. The main control board 1110, and the interface board 1130 and/or the interface board 1140 in the network device 1100 may implement functions and/or various steps implemented by the first network device in the foregoing method embodiments. For brevity, details are not described herein again.

It should be noted that, there may be one or more main control boards. When there are a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented through the switching board, to provide a large-capacity data exchange and processing capability. Therefore, a data access and processing capability of a network device in the distributed architecture is better than that of a device in the centralized architecture. In an embodiment, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a relatively weak data exchange and processing capability. Which architecture is specifically used depends on a specific networking deployment scenario, and is not uniquely limited herein.

In some possible embodiments, the first network device may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine may be configured as a first network device. For example, the first network device may be implemented based on a general-purpose physical server in combination with a network functions virtualization (NFV) technology. The first network device is a virtual host, a virtual router, or a virtual switch. After reading this application, with reference to the NFV technology, a person skilled in the art may virtualize, on the general-purpose physical server, the first network devices having the foregoing functions. Details are not described herein.

It should be understood that the network devices in the foregoing product forms separately have any function of the first network device in the foregoing method embodiments, and details are not described herein.

An embodiment of this application provides a computer program product. The computer program product, when run on a network device, enable the network device to perform the method performed by the network device 2 in the method embodiment corresponding to FIG. 2.

Figure 12:
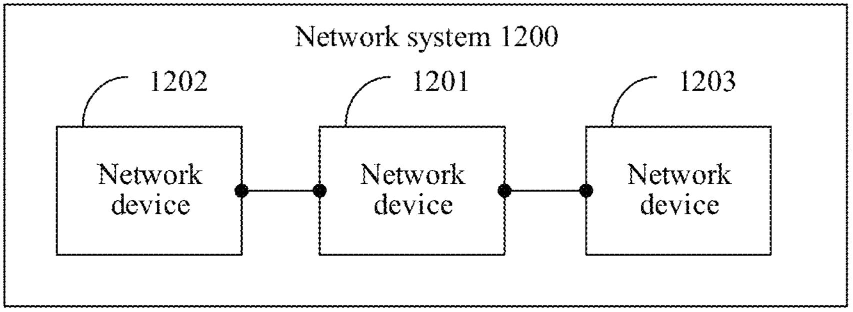
FIG. 12 is a schematic structural diagram of a network system 1200 according to an embodiment of this application.

Referring to FIG. 12, an embodiment of this application provides a network system 1200. The system 1200 includes a network device 1201, a network device 1202, and a network device 1203. The network device 1201 is separately connected to the network device 1202 and the network device 1203. In an embodiment, the network device 1201 may be the first network device in the method embodiment corresponding to FIG. 2.

An embodiment of this application further provides a chip, including a processor and an interface circuit. The interface circuit is configured to receive an instruction and transmit the instruction to the processor. The processor is coupled to a memory. The memory is configured to store a program or instructions. When the program or the instructions are executed by the processor, the chip system is enabled to implement the method according to any one of the foregoing method embodiments.

In an embodiment, there may be one or more processors in the chip system. The processor may be implemented through hardware, or may be implemented through software. When the processor is implemented through the hardware, the processor may be a logic circuit, an integrated circuit, or the like. When the processor is implemented through the software, the processor may be a general-purpose processor, and is implemented by reading software code stored in the memory.

In an embodiment, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on chip (SoC), a central processor unit (CPU), a network processor (NP), a digital signal processor (DSP), a micro controller unit (MCU), a programmable logic device (PLD), or another integrated chip.

The foregoing describes embodiments of this application in detail. Steps in the methods in embodiments of this application may be sequentially scheduled, combined, or deleted according to an actual requirement. Modules in the apparatus in embodiments of this application may be divided, combined, or deleted according to an actual requirement.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device/server, or the like) to perform all or some of the steps of the methods in embodiments of this application. The foregoing storage medium includes any medium that can store program code, such as a USB flash drive, a removable hard disk, a read-only memory, a random access memory, a magnetic disk, or an optical disc.

What is claimed is:

1. A packet processing method, comprising:

obtaining, by a first network device, a first packet, wherein the first packet comprises a first slice identifier, the first slice identifier comprises a plurality of sub-identifiers, the plurality of sub-identifiers indicate different attributes of a first network slice, and the first slice identifier identifies the first network slice to which the first packet belongs, wherein the plurality of sub-identifiers comprise a topology identifier, wherein the topology identifier indicates a topology of the first network slice; and forwarding, by the first network device, the first packet based on the first slice identifier.

2. The method according to claim 1, wherein the plurality of sub-identifiers comprise a resource identifier, the resource identifier indicates a forwarding resource of the first network slice.

3. The method according to claim 2, wherein the plurality of sub-identifiers further comprise an algorithm identifier, and the algorithm identifier indicates a path computation algorithm of the first network slice.

4. The method according to claim 1, wherein the plurality of sub-identifiers comprise an algorithm identifier and a resource identifier, the algorithm identifier indicates a path computation algorithm of the first network slice, and the resource identifier indicates a forwarding resource of the first network slice.

5. The method according to claim 2, wherein the plurality of sub-identifiers further comprise a domain identifier, and the domain identifier indicates a network domain in which the first slice identifier is effective.

6. The method according to claim 1, wherein the plurality of sub-identifiers comprise a domain identifier and a resource identifier, the domain identifier indicates a network domain in which the first slice identifier is effective, and the resource identifier indicates a forwarding resource of the first network slice.

7. The method according to claim 1, wherein a forwarding resource comprises a physical interface, a logical sub-interface, and/or a packet queue.

8. The method according to claim 1, wherein the forwarding, by the first network device, the first packet based on the first slice identifier comprises:

determining, by the first network device based on the plurality of sub-identifiers in the first slice identifier and a mapping table, an interface for forwarding the first packet and a forwarding resource of the interface; and forwarding, by the first network device, the first packet to a second network device based on the forwarding resource of the interface, wherein the mapping table comprises a mapping relationship between the interface and the plurality of sub-identifiers.

9. The method according to claim 1, wherein the plurality of sub-identifiers further comprise a flag bit identifier, the flag bit identifier indicates a forwarding policy corresponding to the first slice identifier, and the forwarding policy indicates a forwarding behavior performed after an interface is determined based on a sub-identifier for guiding forwarding.

10. The method according to claim 9, wherein the forwarding behavior comprises: if the interface for forwarding cannot be found based on the first slice identifier, skipping determining, based on the first slice identifier, the interface for forwarding; or discarding the first packet if the interface for forwarding cannot be found based on the first slice identifier.

11. The method according to claim 1, further comprising:

receiving, by the first network device, a second packet, wherein the second packet comprises a second slice identifier; and updating, by the first network device, the second slice identifier to the first slice identifier, to obtain the first packet.

12. The method according to claim 11, wherein the first slice identifier indicates the first network slice in a first network domain, the second slice identifier indicates a second network slice in a second network domain, and a service-level agreement (SLA) of the first network slice is the same as an SLA of the second network slice.

13. The method according to claim 11, wherein the first network device is a boundary node of a bearer network, and the second slice identifier is single network slice selection assistance information (S-NSSAI) or an application-aware networking (APN) identifier.

14. The method according to claim 11, further comprising:

receiving, by the first network device, a third packet;

determining, by the first network device, a network slice to which the third packet belongs; and adding, by the first network device based on the network slice to which the third packet belongs, the first slice identifier to the third packet, to obtain the first packet.

15. The method according to claim 14, wherein the determining, by the first network device, a network slice to which the third packet belongs comprises:

determining, by the first network device based on information in the third packet, the network slice to which the third packet belongs, wherein the information in the third packet comprises one or more of the following information: a source address, a destination address, a protocol number, a differentiated services code point (DSCP) field, a traffic class (TC) field, a virtual local area network identifier, or a port number.

16. The method according to claim 14, wherein the adding, by the first network device based on the network slice to which the third packet belongs, the first slice identifier to the third packet comprises:

adding, by the first network device based on the network slice to which the third packet belongs, the first slice identifier and a fourth slice identifier to the third packet, to obtain the first packet, wherein the fourth slice identifier identifies, in a bearer network comprising a plurality of network domains, the network slice to which the third packet belongs.

17. The method according to claim 14, wherein the determining, by the first network device, a network slice to which the third packet belongs comprises:

determining, by the first network device based on a third slice identifier in the third packet, the network slice to which the third packet belongs, wherein the third slice identifier identifies, in a bearer network comprising a plurality of network domains, the network slice to which the third packet belongs.

18. A network device, comprising:

a memory storing instructions; and a processor coupled to the memory; wherein the instructions, when executed by the processor, cause the network device to be configured to:

obtain a first packet, wherein the first packet comprises a first slice identifier, the first slice identifier comprises a plurality of sub-identifiers, the plurality of sub-identifiers indicate different attributes of a first network slice, and the first slice identifier identifies the first network slice to which the first packet belongs, wherein the plurality of sub-identifiers comprise a topology identifier, wherein the topology identifier indicates a topology of the first network slice; and forward the first packet based on the first slice identifier.

19. The network device according to claim 18, wherein the plurality of sub-identifiers comprise a resource identifier, the resource identifier indicates a forwarding resource of the first network slice.

20. A non-transitory computer-readable storage medium, wherein the computer-readable storage medium stores computer-readable instructions, and when the computer-readable instructions are executed by a processor to cause a network device to perform operations:

obtaining a first packet, wherein the first packet comprises a first slice identifier, the first slice identifier comprises a plurality of sub-identifiers, the plurality of sub-identifiers indicate different attributes of a first network slice, and the first slice identifier identifies the first network slice to which the first packet belongs, wherein the plurality of sub-identifiers comprise a topology identifier, wherein the topology identifier indicates a topology of the first network slice; and forwarding the first packet based on the first slice identifier.

* * * * *